(12) United States Patent
Akama et al.

(10) Patent No.: US 11,335,003 B2
(45) Date of Patent: *May 17, 2022

(54) INFORMATION PROCESSING APPARATUS, INFORMATION PROCESSING METHOD, AND PROGRAM

(71) Applicant: Sony Corporation, Tokyo (JP)

(72) Inventors: Taketo Akama, Tokyo (JP); Jianing Wu, Tokyo (JP); Masataka Shinoda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/987,188

(22) Filed: Aug. 6, 2020

(65) Prior Publication Data

US 2020/0364869 A1    Nov. 19, 2020

Related U.S. Application Data

(63) Continuation of application No. 16/320,246, filed as application No. PCT/JP2017/027435 on Jul. 28, 2017, now Pat. No. 10,783,638.

(30) Foreign Application Priority Data

Aug. 1, 2016    (JP) .............................. JP2016-151178

(51) Int. Cl.
  *G06T 7/00*    (2017.01)
  *G06T 3/20*    (2006.01)
  (Continued)

(52) U.S. Cl.
  CPC .............. *G06T 7/0016* (2013.01); *G06T 3/20* (2013.01); *G06T 7/0014* (2013.01); *G06T 7/62* (2017.01);
  (Continued)

(58) Field of Classification Search
  USPC ......................................................... 348/143
  See application file for complete search history.

(56) References Cited

U.S. PATENT DOCUMENTS 8,951,184 B2    2/2015 Wong et al.
9,001,884 B2    4/2015 Garakani et al.
(Continued)

FOREIGN PATENT DOCUMENTS

EP    1 267 305 A1    12/2002
GB    2524082 A       9/2015
(Continued)

OTHER PUBLICATIONS

International Search Report and Written Opinion dated Oct. 10, 2017 in connection with International Application No. PCT/JP2017/024515.

(Continued)

*Primary Examiner* — Behrooz M Senfi
(74) *Attorney, Agent, or Firm* — Wolf, Greenfield & Sacks, P.C.

(57) ABSTRACT

Methods and apparatus for analyzing embryonic development images. The method comprises obtaining a plurality of embryonic development images captured in a time series, determining, for at least one of the plurality of embryonic development images, a time series of evaluation values for each of a plurality of evaluation items associated with the plurality of embryonic development images, and evaluating a characteristic of cells represented in one or more of the plurality of embryonic development images based, at least in part, on the time series of evaluation values for the plurality of evaluation items.

23 Claims, 22 Drawing Sheets

(51) Int. Cl.
G06T 7/62 (2017.01)
G06T 7/68 (2017.01)

(52) U.S. Cl.
CPC .......... *G06T 7/68* (2017.01); *G06T 2200/24* (2013.01); *G06T 2207/10016* (2013.01); *G06T 2207/20081* (2013.01); *G06T 2207/20092* (2013.01); *G06T 2207/30024* (2013.01); *G06T 2207/30044* (2013.01); *G06T 2207/30242* (2013.01)

(56) References Cited

U.S. PATENT DOCUMENTS

| | | | |
|---|---|---|---|
| 10,783,638 B2 * | 9/2020 | Akama | G06T 7/0016 |
| 11,017,527 B2 * | 5/2021 | Oshima | G06K 9/00147 |
| 11,030,490 B2 * | 6/2021 | Itu | G06K 9/6254 |
| 2003/0185450 A1 | 10/2003 | Garakani et al. | |
| 2013/0165745 A1 * | 6/2013 | Wong | G06K 9/00147 |
| | | | 600/34 |
| 2013/0225431 A1 | 8/2013 | Chavez et al. | |
| 2014/0063225 A1 | 3/2014 | Kang et al. | |
| 2014/0206931 A1 | 7/2014 | Zernicka-Goetz et al. | |
| 2014/0349334 A1 | 11/2014 | Chavez et al. | |
| 2015/0079621 A1 | 3/2015 | An et al. | |
| 2018/0330510 A1 | 11/2018 | Watanabe | |
| 2019/0259155 A1 | 8/2019 | Oshima et al. | |
| 2019/0272641 A1 | 9/2019 | Akama et al. | |

FOREIGN PATENT DOCUMENTS

| | | |
|---|---|---|
| JP | 2009-044974 A | 3/2009 |
| JP | 2009-512037 A | 3/2009 |
| JP | 2010-181402 A | 8/2010 |
| JP | 2011-192109 A | 9/2011 |
| JP | 2013-198817 A | 10/2013 |
| JP | 2014-089193 A | 5/2014 |
| JP | 2014-520522 A | 8/2014 |
| JP | 2015-197738 A | 11/2015 |
| JP | 2015-203920 A | 11/2015 |
| WO | WO 03/077552 A1 | 9/2003 |
| WO | WO 2007/042044 A1 | 4/2007 |
| WO | WO 2011/025736 A1 | 3/2011 |
| WO | WO 2013/005012 A1 | 1/2013 |

OTHER PUBLICATIONS

International Preliminary Report on Patentability dated Jan. 24, 2019 in connection with International Application No. PCT/JP2017/024515.
International Search Report and Written Opinion dated Nov. 8, 2017 in connection with International Application No. PCT/JP2017/027435.
International Preliminary Report on Patentability dated Feb. 14, 2019 in connection with International Application No. PCT/JP2017/027435.
European Communication pursuant to Article 94(3) dated Apr. 23, 2020 in connection with European Application No. 17 761 335.3.
Japanese Office Action dated May 12, 2020 in connection with Japanese Application No. 2016-151178, and English translation thereof.
[No Author Listed], How the Eeva System Works. Oct. 31, 2014. YouTube video. Retrieved from https://www.youtube.com/watch?v=TJ65a3Lzmy8 (.mp4 file; DVD enclosed).
Germain et al., Characterization of cell deformation and migration using a parametric estimation of image motion. IEEE Transactions on Biomedical Engineering. May 1999; vol. 46(5), pp. 584-599.
Rad et al., Automatic cleavage detection in H.264 sequence of human embryo development, 2016 IEEE Canadian Conference on Electrical and Computer Engineering (CCECE), May 15, 2016, pp. 1-4.
U.S. Appl. No. 16/315,323, filed Jan. 4, 2019, Oshima et al.
U.S. Appl. No. 16/320,246, filed Jan. 24, 2019, Akama et al.

* cited by examiner

INFORMATION PROCESSING APPARATUS, INFORMATION PROCESSING METHOD, AND PROGRAM

CROSS-REFERENCE TO RELATED APPLICATIONS

The present application claims the benefit under 35 U.S.C. § 120 as a continuation application of U.S. application Ser. No. 16/320,246, filed on Jan. 24, 2019, now U.S. Pat. No. 10,783,638, which claims the benefit under 35 U.S.C. § 371 as a U.S. National Stage Entry of International Application No. PCT/US2017/027435, filed in the U.S. Patent and Trademark Office as a Receiving Office on Jul. 28, 2017, which claims priority to Japanese Priority Patent Application JP 2016-151178 filed Aug. 1, 2016, the entire contents of each of which is incorporated herein by reference.

TECHNICAL FIELD

The present technology relates to an information processing apparatus, an information processing method, and a program applicable to evaluation of a fertile ovum or the like.

BACKGROUND ART

Patent Literature 1 discloses a technology in which a fertile ovum of a farm animal or the like is cultured and grown enough to be implanted. According to Patent Literature 1, an image processing apparatus captures images of one fertile ovum at different times with a constant illuminant direction, and obtains an image group including the captured images. A reference image is selected from the obtained image group, and the profile of the fertile ovum of the selected reference image is detected as a reference profile. A predetermined profile processing is executed with reference to the reference profile, and the profile of the fertile ovum of an arbitrary image of the image group is therefore determined. As a result, the positions of the fertile ovum of all the images of the image group are matched accurately, and therefore it is possible to output such fertile ovum images. The accuracy of analysis of a fertile ovum is therefore increased (Patent Literature 1, specification, paragraphs [0029], [0041] to [0043], and [0078], etc.).

CITATION LIST

Patent Literature

[PTL 1]
Japanese Patent Application Laid-open No. 2011-192109

SUMMARY

Technical Problem

It is desirable to provide a technology for evaluating a fertile ovum-under-observation or the like with a high degree of accuracy.

In view of the above-mentioned circumstances, it is desirable to provide an information processing apparatus, an information processing method, and a program with which a cell-under-observation can be evaluated with a high degree of accuracy.

Solution to Problem

According to the present disclosure, there is provided an embryonic development analysis system. The embryonic analysis system comprising circuitry configured to obtain a plurality of embryonic development images captured in a time series, determine, for at least one of the plurality of embryonic development images, a time series of evaluation values for each of a plurality of evaluation items associated with the plurality of embryonic development images, and evaluate a characteristic of cells represented in one or more of the plurality of embryonic development images based, at least in part, on the time series of evaluation values for the plurality of evaluation items.

Further, according to the present disclosure, there is provided an embryonic development analysis method. The embryonic development analysis method comprising obtaining a plurality of embryonic development images captured in a time series, determining, for at least one of the plurality of embryonic development images, a time series of evaluation values for each of a plurality of evaluation items associated with the plurality of embryonic development images, and evaluating a characteristic of cells represented in one or more of the plurality of embryonic development images based, at least in part, on the time series of evaluation values for the plurality of evaluation items.

Further, according to the present disclosure, there is provided an embryonic development analysis system. The embryonic development analysis system comprising an image capture device configured to capture a time series of embryonic development images, a database configured to store the captured time series of embryonic development images, and circuitry configured to instruct the image capture device to capture the time series of embryonic development images, determine, for at least one of the plurality of embryonic development images, a time series of evaluation values for each of a plurality of evaluation items associated with the plurality of embryonic development images, and evaluate a characteristic of cells represented in one or more of the plurality of embryonic development images based, at least in part, on the time series of evaluation values for the plurality of evaluation items.

According to an embodiment of the present technology, there is provided an information processing apparatus including an obtaining unit, an assigning unit, and an evaluating unit.

The obtaining unit is configured to obtain a plurality of images of a cell captured in time series.

The assigning unit is configured to assign evaluation values in time series to each of one or more predetermined evaluation items for the plurality of obtained images. The evaluating unit is configured to evaluate the cell on the basis of a change-in-time of the assigned evaluation values in time series.

According to the information processing apparatus, evaluation values in time series are assigned for a plurality of images of a cell captured in time series. Further, the cell is evaluated on the basis of the change-in-time of the assigned evaluation values. Therefore it is possible to evaluate the cell-under-observation with a high degree of accuracy. In other words, it is possible to evaluate a cell in view of comprehensive time-series evaluations.

The evaluating unit may be configured to evaluate the cell according to a first machine learning algorithm. Therefore it is possible to evaluate the cell-under-observation with a high degree of accuracy. The assigning unit may be configured to assign the evaluation values for each of the plurality of obtained images.

Therefore the accuracy of evaluation can be increased. The assigning unit may be configured to assign the evaluation values for an image group including the plurality of images captured sequentially in time series. Therefore it is possible to reduce time and effort to assign evaluation values. The assigning unit may include a predicting unit configured to calculate predicted evaluation values, the predicted evaluation values being predicted values of the evaluation value. In this case, the information processing apparatus may further include an output unit configured to output a GUI (Graphical User Interface) for inputting the evaluation values, the GUI displaying the predicted evaluation values.

Therefore it is possible to assist a user to input evaluation values and to reduce time and effort to input evaluation values.

The predicting unit may be configured to calculate the predicted evaluation values according to a second machine learning algorithm.

Therefore it is possible to calculate predicted evaluation values with a high degree of accuracy, and to satisfactorily assist a user to input evaluation values.

The GUI may be capable of executing at least one of an operation to input the displayed predicted evaluation values as the evaluation values, and an operation to correct the displayed predicted evaluation values and to input the corrected values as the evaluation values.

Therefore it is possible to satisfactorily assist a user to input evaluation values and to satisfactorily reduce time and effort to input evaluation values.

The GUI may be capable of executing an operation to sequentially input the evaluation values in the time series.

Therefore it is possible to satisfactorily assist a user to input evaluation values.

The predicting unit may be configured to select a reference image from the images, the evaluation values having been assigned to the images. In this case, the GUI may be configured to display the selected reference image and display reference evaluation values, the reference evaluation values being assigned to the selected reference image. Therefore a user can input evaluation values while confirming reference images and their reference evaluation values.

The GUI may be capable of executing at least one of an operation to input the displayed reference evaluation values as the evaluation values, and an operation to correct the displayed reference evaluation values and to input the corrected values as the evaluation values.

Therefore it is possible to satisfactorily assist a user to input evaluation values.

The GUI may be configured to display a change-in-time of the reference evaluation values assigned to the selected reference image.

Therefore it is possible to satisfactorily assist a user to input evaluation values.

The predicting unit may be configured to select a similar image as the reference image, the similar image being similar to an image whose evaluation values are to be predicted. Therefore it is possible to satisfactorily assist a user to input evaluation values.

The assigning unit may be configured to select a plurality of images similar to each other as an image group whose evaluation values are to be predicted.

Therefore it is possible to input evaluation values for a plurality of images efficiently.

The assigning unit may be configured to select a distinctive image as the image whose evaluation values are to be predicted, the distinctive image being selected with reference to an image, the predicted evaluation values having been assigned to the image. In this case, the predicting unit may be configured to use the evaluation values assigned to the selected distinctive image as supervisory data for the second machine learning algorithm. Therefore it is possible to increase the accuracy of calculating predicted evaluation values, and to satisfactorily assist a user to input evaluation values.

The assigning unit may be configured to select an image having low certainty of the predicted evaluation values as the image whose evaluation values are to be predicted. In this case, the predicting unit may be configured to use the evaluation values assigned to the selected image having the low certainty of the predicted evaluation values as supervisory data for the second machine learning algorithm.

Therefore it is possible to increase the accuracy of calculating predicted evaluation values, and to satisfactorily assist a user to input evaluation values.

According to an embodiment of the present technology, there is provided an information processing method executable by a computer system. The information processing method includes: obtaining a plurality of images of a cell captured in time series; assigning evaluation values in time series to each of one or more predetermined evaluation items for the plurality of obtained images; and evaluating the cell on the basis of a change-in-time of the assigned evaluation values in time series.

According to an embodiment of the present technology, there is provided a program executable by a computer system. The program causes the computer system to: obtain a plurality of images of a cell captured in time series; assign evaluation values in time series to each of one or more predetermined evaluation items for the plurality of obtained images; and evaluate the cell on the basis of a change-in-time of the assigned evaluation values in time series.

Advantageous Effects

As described above, according to the present technology, it is possible to evaluate a cell-under-observation with a high degree of accuracy. Note that the above-mentioned effects are not limitation. Any effects to be described in the present disclosure will be obtained.

DESCRIPTION OF EMBODIMENTS

Hereinafter, embodiments of the present technology will be described with reference to the drawings.

First Embodiment

[Evaluation System]

Figure 1:
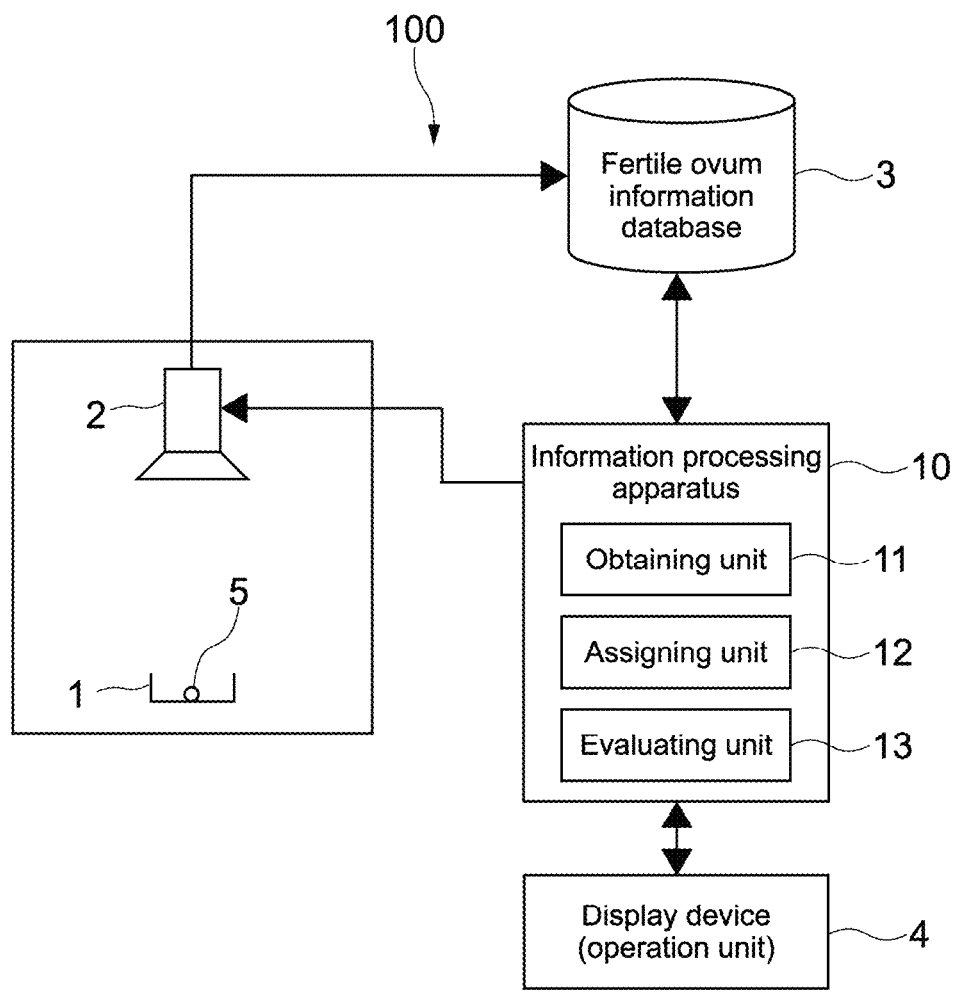
FIG. 1 is a diagram schematically showing a configuration example of an evaluation system according to a first embodiment.

FIG. 1 is a diagram schematically showing a configuration example of an evaluation system according to a first embodiment of the present technology. The evaluation system 100 includes the culture vessel 1, the image capturing unit 2, the fertile ovum information DB (database) 3, the display device 4, and the information processing apparatus 10.

The culture vessel 1 is capable of holding culture solution and the cell 5, and is translucent so as to be capable of capturing images of the cell 5 from the outside. The shape of the culture vessel 1 is not particularly limited, and, for example, the culture vessel 1 such as a petri dish having a shallow dish shape is used. Note that the numbers of culture vessels 1 and cells 5, an image of which can be captured simultaneously, are not limited.

In the present embodiment, an example of the cell 5 to be cultured is a fertile ovum of an animal in the livestock industrial field and other fields, and such a fertile ovum will be described as an example (hereinafter, it will be referred to as the fertile ovum 5 denoted by the same reference numeral). Not limited to this, the present technology is applicable to arbitrary cells such as unfertilized egg cells (ova), embryos, and the like of animals in the livestock industrial field and other fields, and arbitrary cells such as biological samples obtained from living bodies such as stem cells, immune cells, and cancer cells in the regenerative medical field, the pathobiological field, and other field.

Further, in the present specification, a "cell" (singular) at least conceptually includes an individual cell and an aggregate of a plurality of cells. One or more "cells" as referred to herein relates to cells observed in one or more stages of embryonic development including, but not limited to, an oocyte, an egg (ovum), a fertile ovum (zygote), a blastocyst, and an embryo.

The image capturing unit 2 captures images of the fertile ovum 5 held in the culture vessel 1 in time series at predetermined image-capturing intervals. As a result, the image capturing unit 2 generates a plurality of images (hereinafter, referred to as fertile ovum images) of the fertile ovum 5, which transforms in the course of the culturing progress. The number of captured fertile ovum images, the image-capturing interval, and the like may be arbitrarily set. For example, where the IVC period (in-vitro culture period) is 9 days and the image-capturing interval is 5 minutes, about 2600 fertile ovum images of the one fertile ovum 5 are captured.

The image capturing unit 2 includes a visible light camera including an image sensor such as, for example, a CMOS (Complementary Metal-Oxide Semiconductor) sensor and a CCD (Charge Coupled Device) sensor. An infrared (IR) camera, a polarization camera, or another camera may be used instead of or in addition to the visible light camera.

The fertile ovum information DB 3 stores a plurality of fertile ovum images captured by the image capturing unit 2 in association with fertile ovum IDs, image-capturing time, culture conditions, and the like. The fertile ovum information DB 3 further stores evaluation values and general evaluations of fertile ova (described later).

The display device 4 includes a display device using liquid crystal, EL (Electro-Luminescence) or the like, for example, and operation devices (operation unit) for inputting a user's operation such as a keyboard and a mouse. The display device 4 may also be a touch panel including a display device and an operation device integrally.

How the information processing apparatus 10, the fertile ovum information DB 3, and the display device 4 are connected to each other is not limited. For example, those devices may be connected to each other such that those devices can communicate with each other via a network such as the Internet. Therefore the information processing apparatus 10 and the fertile ovum information DB 3 can be accessed remotely via the network, and they can be controlled as necessary and receive intended operations.

The information processing apparatus 10 controls operations of the respective blocks of the evaluation system 100. In the present embodiment, the information processing apparatus 10 controls operations of the image capturing unit 2, and the image capturing unit 2 thereby captures a plurality of fertile ovum images. Further, the information processing apparatus 10 evaluates the fertile ovum 5 on the basis of the plurality of fertile ovum images. Note that, according to a possible configuration, the information processing apparatus 10 only evaluates a fertile ovum on the basis of a plurality of fertile ovum images captured by another image-capturing system or the like.

The information processing apparatus 10 includes hardware resources that a computer essentially includes, such as a CPU (Central Processing Unit), a ROM (Read Only Memory), a RAM (Random Access Memory), and an HDD (Hard Disk Drive). For example, the information processing apparatus 10 may be a PC (Personal Computer). Alternatively, the information processing apparatus 10 may be another arbitrary computer.

The CPU loads a program of the present technology stored in the ROM or the HDD into the RAM and executes the program, whereby the obtaining unit 11, the assigning unit 12, and the evaluating unit 13, i.e., functional blocks are realized. Further, those functional blocks execute the information processing method of the present technology. Note that dedicated hardware resources may be used to realize the respective functional blocks as necessary.

The program is, for example, recorded in one of a various kinds of recording media and installed into the information processing apparatus 10. Alternatively, the program may be installed via the Internet.

[Evaluation of Fertile Ovum]

Figure 2:
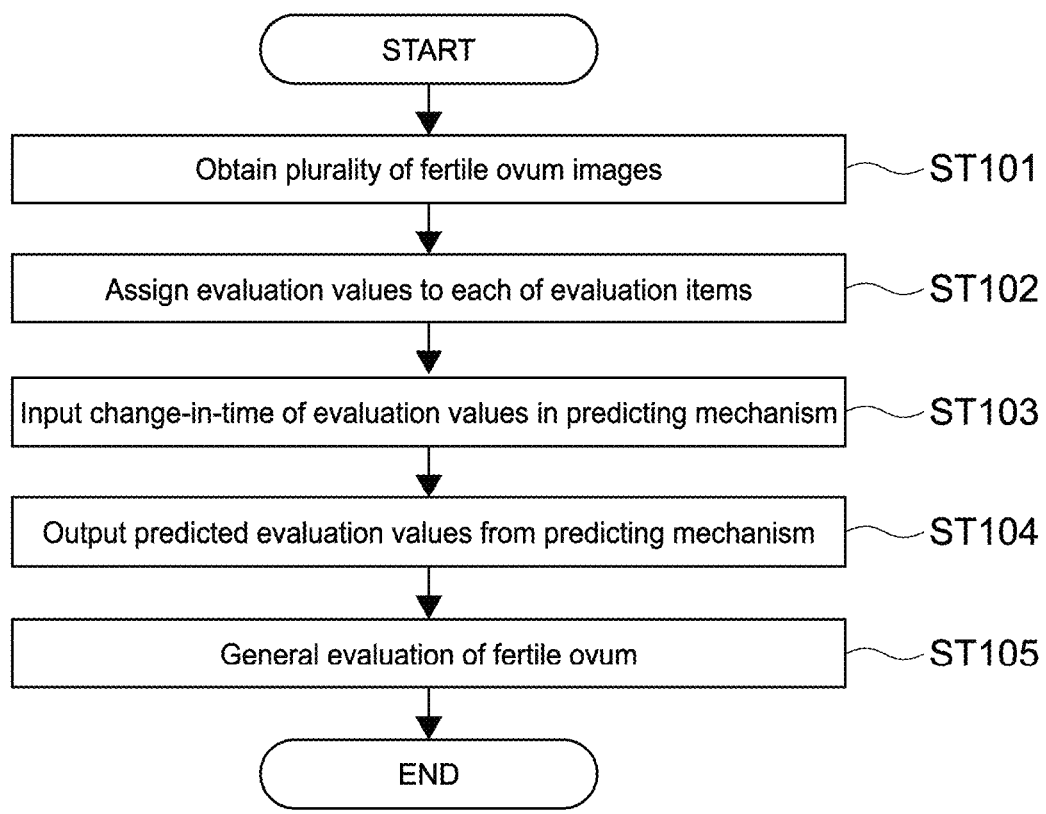
FIG. 2 is a flowchart showing an example of evaluation of a fertile ovum.
Figure 3:
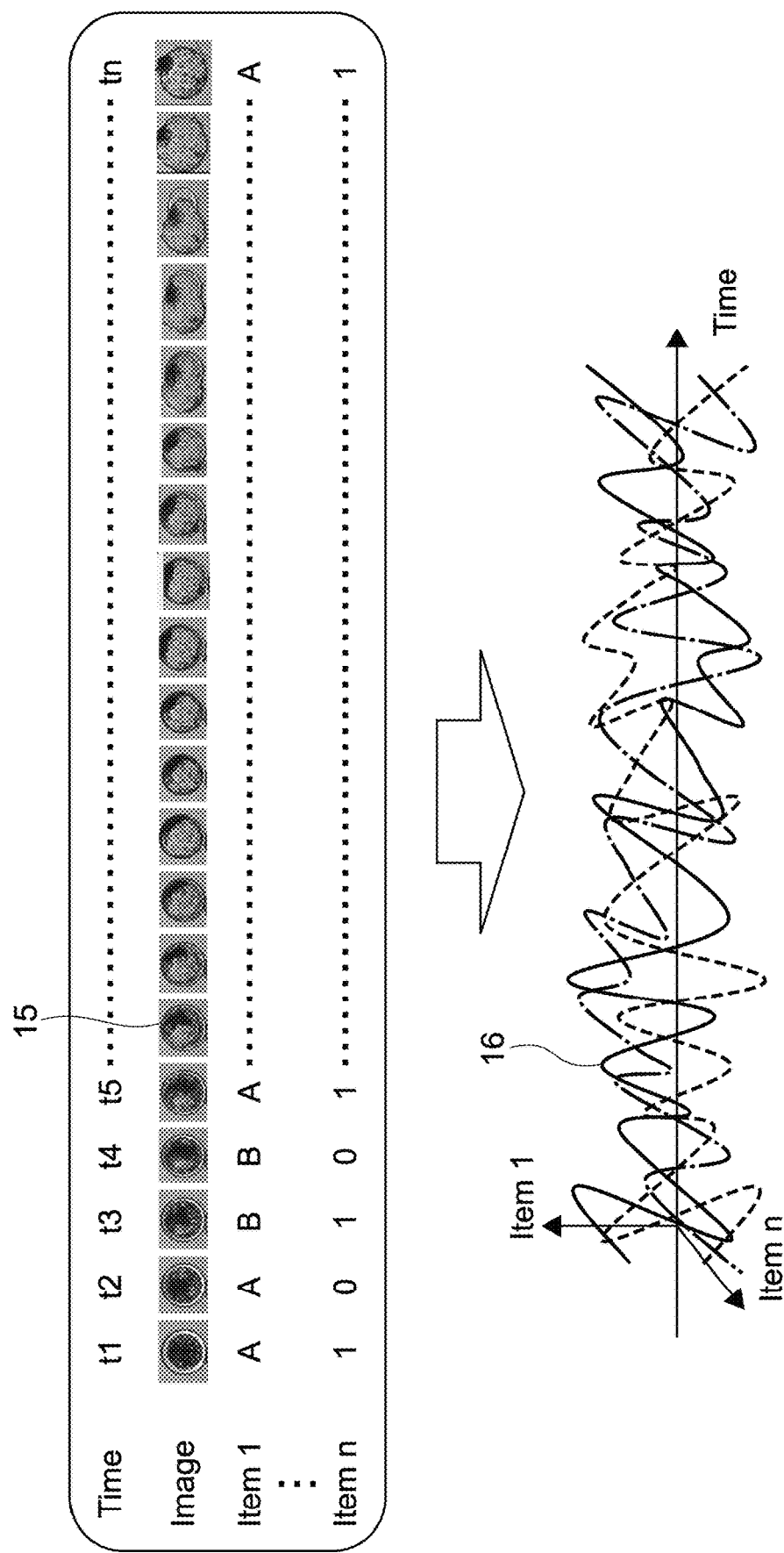
FIG. 3 is a diagram illustrating how to assign evaluation values in time series and how to calculate a waveform-of-change.
Figure 4:
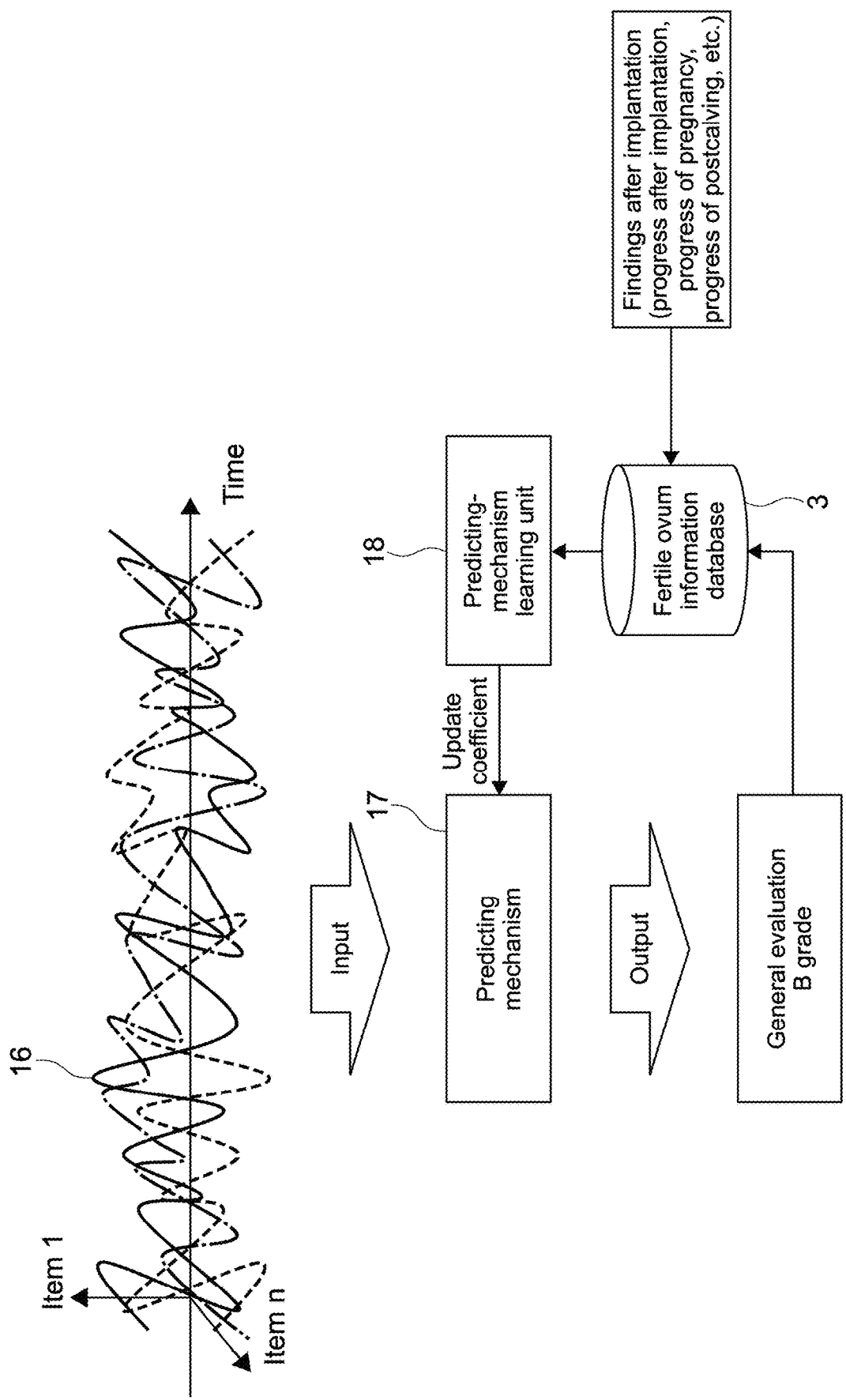
FIG. 4 is a diagram illustrating general evaluation based on the waveform-of-change.

FIG. 2 is a flowchart showing an example of evaluation of a fertile ovum according to the present technology. Each of FIG. 3 and FIG. 4 is a diagram illustrating steps of FIG. 2.

The obtaining unit 11 obtains a plurality of fertile ovum images captured in time series (Step 101). As shown in FIG. 3, a plurality of fertile ovum images 15 are obtained in association with the image-capturing time t. The obtained fertile ovum image 15 may be preprocessed, e.g., the image may be normalized, the position of the fertile ovum 5 may be adjusted, the shape may be highlight-filtered, and the like.

The assigning unit 12 assigns evaluation values in time series to each of one or more predetermined evaluation items for the plurality of obtained fertile ovum images 15 (Step 102). As shown in FIG. 3, in the present embodiment, as the one or more predetermined evaluation items, the evaluation items 1 to n are set.

The specific evaluation items are not particularly limited, but may be arbitrarily set. Examples of the evaluation items for the fertile ovum 5 include size, shape, sphericity, transmissivity, number of cell-division (rate), degree of uniformity of cell-division, symmetric property, amount of fragmentation, rate of fragmentation, and the like. Examples of the evaluation items further include time information, which is calculated depending on transformation of the fertile ovum 5, such as cell-division interval time periods (including time before early cell-division, interval between early cell-division and second cell-division, and the like).

Further, not limited to preset evaluation items, the evaluation system 100 may automatically set, as the evaluation items, evaluation parameters that affect the quality (grade) of the fertile ovum 5.

As shown in FIG. 3, evaluation values are assigned to each of the evaluation items 1 to n for the plurality of fertile ovum images 15. As a result, evaluation values in time series are assigned to each of the evaluation items. Evaluation values in time series may be assigned to each of the plurality of fertile ovum images 15 in order, or evaluation values may be assigned in an arbitrary order. Anyway, evaluation values are assigned to each of the fertile ovum images 15, and evaluation values in time series are thus assigned.

Specific values assigned as evaluation values are different for evaluation items. For example, one of grades A to F is assigned to each of the sphericity of the fertile ovum 5 and the degree of uniformity of cell-division. In this case, for example, an evaluation value "no evaluation" is assigned to an unevaluated image (for example, evaluation item is cell-division status, and no cell-division is found in image, etc.) out of the plurality of fertile ovum images 15. Further, a binary, i.e., 0 or 1, may be assigned to a certain evaluation item (for example, if intended condition is satisfied or not, etc.) as an evaluation value.

Where the evaluation item is time information, which depends on the status transformation of the fertile ovum 5, such as cell-division interval time periods, a value indicating each status may be assigned as an evaluation value. For example, the number of cell-division as it is may be assigned as an evaluation value, and a cell-division interval time period may be calculated as an evaluation result on the basis of this evaluation value. In other words, the evaluation values to the respective evaluation items include not only the evaluation result (grade A to F, etc.) for the fertile ovum images 15 but also parameters (number of cell-division, etc.) used to generate evaluation results.

An evaluation value is, for example, assigned in response to an input operation into the display device 4 by a specialist (user) such as an embryologist. For example, a user observes the fertile ovum images 15 displayed on the display device 4 and, at the same time, inputs his findings as evaluation values. The assigning unit 12 assigns the input evaluation values for the fertile ovum images 15.

Alternatively, the information processing apparatus 10 may automatically assign evaluation values. For example, the assigning unit 12 analyzes the fertile ovum images 15, and assigns evaluation values to the respective evaluation items. Alternatively, the assigning unit 12 may assign evaluation values according to a predetermined machine learning algorithm.

For example, a machine learning algorithm that employs a neural network such as RNN (Recurrent Neural Network), CNN (Convolutional Neural Network), and MLP (Multilayer Perceptron) may be used. Alternatively, an arbitrary machine learning algorithm that executes supervised learning, unsupervised learning, semi-supervised learning, reinforcement learning, or other learning may be used.

How the assigning unit 12 assigns evaluation values according to a machine learning algorithm will be described in detail in a second embodiment.

As shown in FIG. 3, according to the present embodiment, the waveform-of-change 16 is calculated on the basis of evaluation values assigned for the plurality of fertile ovum images 15, the waveform-of-change 16 showing change-in-time of each evaluation item. FIG. 3 schematically shows two evaluation axes for the evaluation items 1 and n and the three waveforms-of-change 16. Actually, the waveforms-of-change 1 to n corresponding to the evaluation items 1 to n, respectively, are generated. Note that go or no-go of calculation of the waveform-of-change 16 can be set for each evaluation item.

The evaluating unit 13 evaluates the fertile ovum 5 according to a predetermined machine learning algorithm on the basis of change-in-time of the evaluation values in time series, i.e., on the basis of the waveform-of-change 16.

As shown in FIG. 4, specifically, the waveform-of-change 16 of each evaluation item is input in the predicting mechanism 17 of the evaluating unit 13 (Step 103). Predicted values are calculated according to a predetermined machine learning algorithm (Step 104). In the present embodiment, predicted values of evaluation items after implanting the fertile ovum 5 in a womb or the like (progress after implantation, conception rate, progress of pregnancy, progress of calving, progress of postcalving, growth of calf, breeding value of grown-up cattle, etc.) are calculated.

General evaluation of the fertile ovum 5 is executed on the basis of the calculated predicted values (Step 105). As shown in FIG. 4, for example, one of the grades A to F or another grade is determined to indicate if the fertile ovum 5 is the most appropriate for an embryo-to-be-implanted or not. Note that general evaluation is executed only on the basis of predicted values to the evaluation items after implantation, which are output in Step 104, for example. Alternatively, general evaluation may be executed also on the basis of evaluation values (the waveform-of-change 16) to the evaluation items, which are assigned in Step 102. The predicted values output from the predicting mechanism 17 and the general evaluation of the fertile ovum 5 are stored in the fertile ovum information DB 3.

The predicting-mechanism learning unit 18 of the evaluating unit 13 updates the predicting mechanism 17 on the basis of a machine learning algorithm. A coefficient, which is a parameter used to calculate a predicted value, is updated on the basis of, for example, the plurality of fertile ovum images 15 stored in the fertile ovum information DB 3, the evaluation values of the respective evaluation items (the waveform-of-change 16), the predicted values output from the predicting mechanism 17, and the general evaluation of the fertile ovum 5. The updated coefficient is output to the predicting mechanism 17.

Further, as shown in FIG. 4, with regard to the fertile ovum 5 selected as an embryo-to-be-implanted on the basis of the general evaluation, for example, findings after implantation (progress after implantation, conception rate, progress of pregnancy, progress of calving, progress of postcalving, growth of calf, breeding value of grown-up cattle, etc.) by an embryologist, a veterinarian, or another specialist are stored in the fertile ovum information DB 3. The findings after implant are also used as supervisory data for a machine learning algorithm.

In the present embodiment, the machine learning algorithm that the evaluating unit 13 uses corresponds to the first machine learning algorithm. The first machine learning algorithm is not particularly limited, and one of the above-mentioned various machine learning algorithms may be used, for example. For example, according to a machine learning algorithm, the difference between an input waveform-of-change and a waveform-of-change, to which general evaluation has been executed, is minimized. Then the machine learning is adapted from the fertile ovum 5, whose waveform-of-change has the smallest difference value.

Note that all the waveforms-of-change 1 to n corresponding to the evaluation items 1 to n are not necessarily to be input in the predicting mechanism 17. Alternatively, some of the waveforms-of-change 1 to n may be input, and a predicted value may be calculated on the basis thereof. Further, general evaluation may be executed on the basis of the calculated predicted value. As a result, processing loads may be reduced, and processing time may be shortened.

As described above, according to the present embodiment, the evaluation system 100 assigns evaluation values in time series for the plurality of fertile ovum images 15 of the fertile ovum 5 captured in time series. Further, the evaluation system 100 evaluates the fertile ovum 5 on the basis of the waveform-of-change 16, which is a change-in-time of the assigned evaluation values, according to a predetermined machine learning algorithm. Therefore it is possible to evaluate the fertile ovum 5 under observation with a high degree of accuracy.

Evaluation with a high degree of accuracy is realized in which temporal change, fluctuation of the quality, various changes in the process of culturing, and the like of the fertile ovum 5 are comprehensively covered. The degree of accuracy of such evaluation is higher than, for example, evaluation on the basis of evaluation values of the fertile ovum 5 at certain date/time points, e.g., the 2nd day, the 5th day, the 7th day, and other days in an IVC period. As a result, a high-quality fertile ovum 5 can be found out, although it was unrecognized before. Further, analysis of the change of evaluation of the fertile ovum 5 under different growing conditions and environments of the fertile ovum 5 may be made easier, and a better condition and a better environment may be found easier.

Note that the larger the number of the fertile ovum images 15 and the number of evaluation items, the higher the accuracy of evaluation. The number of the fertile ovum images 15 and the number of evaluation items may be determined as necessary in view of, for example, desired accuracy of evaluation, a load of assigning evaluation values (for example, cost of inputting evaluation values by a user, etc.), and other factors.

Second Embodiment

An evaluation system according to a second embodiment of the present technology will be described. Hereinafter, description of configurations and functions similar to the configurations and functions of the evaluation system 100 described in the first embodiment will be omitted or simplified.

[Assist System for Assisting to Input Evaluation Values]

An evaluation system of the present embodiment includes an assist system that assists a user to input evaluation values. The assist system is capable of assisting a user to input evaluation values for each of the plurality of fertile ovum images 15 in assigning evaluation values (Step 102) of FIG. 2.

Figure 5:
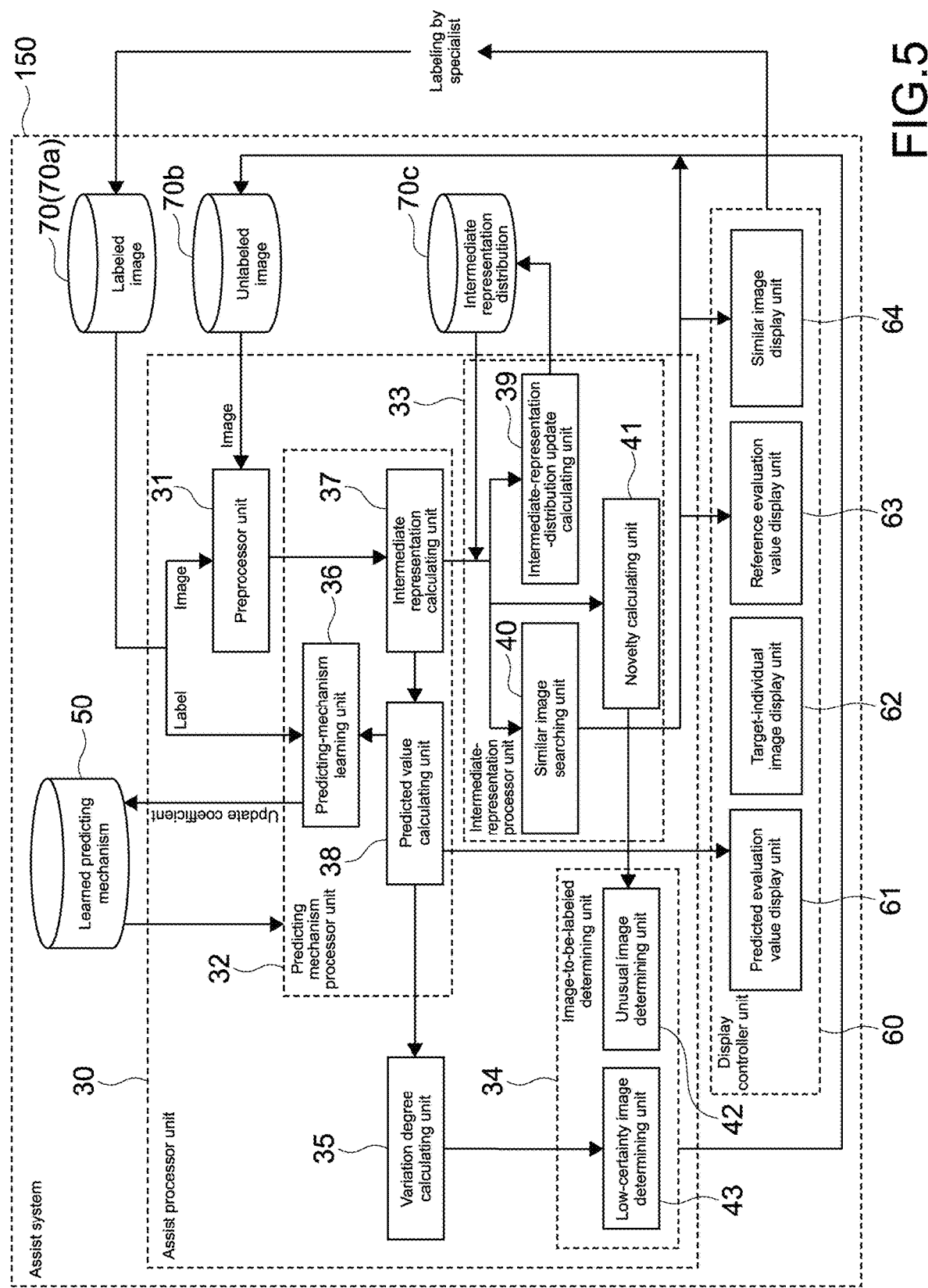
FIG. 5 is a block diagram showing a functional configuration example of the assist system.

FIG. 5 is a block diagram showing a functional configuration example of the assist system. The assist system 150 includes the assist processor unit 30, the learned predicting mechanism 50, the display controller unit 60, and the plurality of DBs 70.

The assist processor unit 30 includes the preprocessor unit 31, the predicting mechanism processor unit 32, the intermediate-representation processor unit 33, the image-to-be-labeled determining unit 34, and the variation degree calculating unit 35. The preprocessor unit 31 preprocesses an image, e.g., normalizes the image, adjusts the position of the fertile ovum 5, highlight-filters the shape, and the like.

The predicting mechanism processor unit 32 includes the predicting-mechanism learning unit 36, the intermediate representation calculating unit 37, and the predicted value calculating unit 38. Those blocks and the learned predicting mechanism 50 calculate predicted evaluation values, the predicted evaluation values being predicted values of the evaluation values to each of the evaluation items for the fertile ovum images 15 which are to be labeled. Note that the label corresponds to an evaluation value to each of the evaluation items.

In the present embodiment, according to a predetermined machine learning algorithm (second machine learning algorithm), predicted evaluation values are calculated. Specifically, a preprocessed unlabeled fertile ovum image 15 is input, intermediate representation is calculated, and then a predicted evaluation value is calculated. Note that the intermediate representation means output in an intermediate layer of a network. In other words, the intermediate representation is an amount of feature, which represents an image feature very well.

The predicting-mechanism learning unit 36 updates a coefficient (parameter for calculating a predicted evaluation value) of the predicting mechanism, and outputs the updated coefficient to the learned predicting mechanism 50. For example, a loss function is calculated on the basis of a predicted evaluation value and an evaluation value input by a user, and the coefficient is updated with the obtained value. Note that a method other than that may alternatively be used. Hereinafter, the predicting mechanism processor unit 32 and the learned predicting mechanism 50 will sometimes be collectively referred to as a predicting mechanism.

The second machine learning algorithm is not particularly limited, and DNN (Deep Neural Network) such as the above-mentioned CNN is used. Alternatively, another machine learning algorithm may be used. Further, the first machine learning algorithm may be the same as or different from the second machine learning algorithm.

The intermediate-representation processor unit 33 includes the intermediate-representation-distribution update calculating unit 39, the similar image searching unit 40, and the novelty calculating unit 41. Those blocks updates intermediate representation distribution, searches a similar image, and calculates novelty of the fertile ovum image 15, respectively.

The image-to-be-labeled determining unit 34 includes the unusual image determining unit 42 and the low-certainty image determining unit 43. Those blocks select the fertile ovum image 15 to be labeled, i.e., the fertile ovum image 15 to which evaluation values are to be assigned.

The variation degree calculating unit 35 calculates the variation degree of a predicted evaluation value. The calculated variation degree is output to the low-certainty image determining unit 43 of the image-to-be-labeled determining unit 34. In other words, the variation degree of an evaluation value is used to select an image to be labeled.

The display controller unit 60 includes the predicted evaluation value display unit 61, the target-individual image display unit 62, the reference evaluation value display unit 63, and the similar image display unit 64. Those blocks display the fertile ovum image 15 of the fertile ovum 5 to be labeled (corresponding to target-individual) and predicted evaluation values. Further, those blocks display the fertile ovum image 15 (similar image) of a similar individual and reference evaluation values.

In the present embodiment, the display controller unit 60 generates a GUI-for-inputting-evaluation-values for inputting evaluation value and outputs the generated GUI to the display device 4. The GUI-for-inputting-evaluation-values displays the labeled fertile ovum image 15, predicted evaluation values, a similar image, and reference evaluation values for the similar image. In the present embodiment, the assist processor unit 30 and the learned predicting mechanism 50 realizes the predicting unit, and the display controller unit 60 realizes the output unit.

The plurality of DBs 70 are in the fertile ovum information DB 3 and include the labeled image DB 70a, the unlabeled image DB 70b, and the intermediate representation distribution DB 70c. The DBs 70 store labeled images, to which evaluation values are assigned, unlabeled images, to which evaluation values are not assigned yet, and intermediate representation distributions, respectively.

[GUI-for-Inputting-Evaluation-Values]

Figure 6:
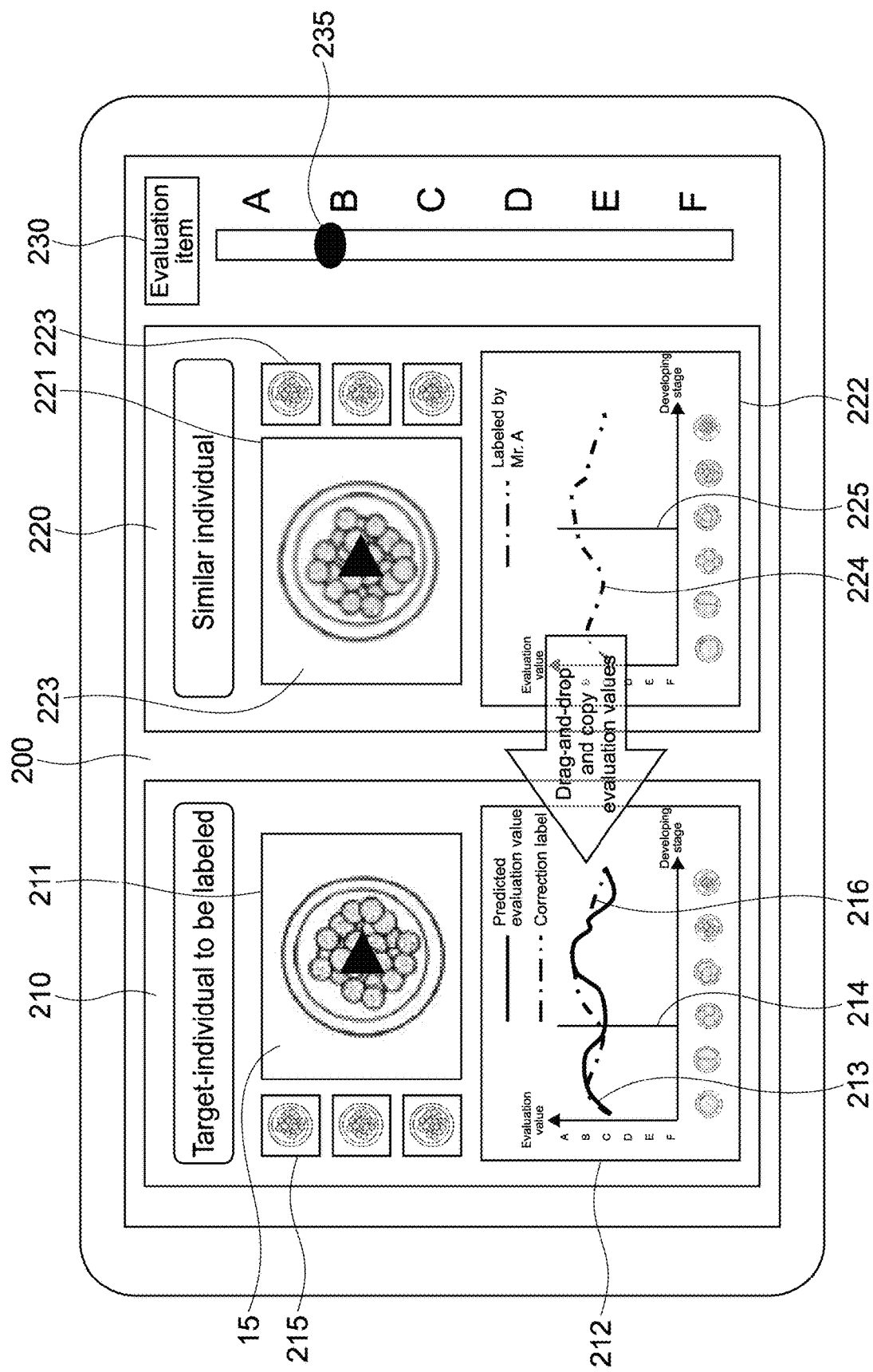
FIG. 6 is a diagram schematically showing a configuration example of the GUI-for-inputting-evaluation-values.

FIG. 6 is a diagram schematically showing a configuration example of the GUI-for-inputting-evaluation-values. The GUI 200 includes the target-individual display area 210, the similar individual display area 220, the evaluation item button 230, and the slider 235.

The target-individual display area 210 includes the target-image display area 211 and the predicted evaluation value display area 212. The fertile ovum image 15, which is selected as an image to which evaluation values are assigned, is displayed on the target-image display area 211. The fertile ovum images 15 are continuously displayed in time series (reproduced as a motion picture). A user inputs operations for reproducing, fast-forwarding, fast-rewinding, and stopping the images and other operations. A fertile ovum image 15 at a desired developing stage can thus be displayed.

Predicted evaluation values calculated by the predicted value calculating unit 38 are displayed in the predicted evaluation value display area 212. As shown in FIG. 6, in the present embodiment, the predicted-waveform-of-change 213, which shows the change-in-time of the predicted evaluation values, is displayed. In the graph displayed in the predicted evaluation value display area 212, the X axis shows the time axis (developing stage) and the Y axis shows evaluation values (grade, etc.). Where the fertile ovum images 15 are reproduced in time series, the time-display bar 214 is displayed on the graph. The time-display bar 214 indicates the date/time at which the displayed fertile ovum image 15 was captured. The time-display bar 214 can be moved, and thereby a different fertile ovum image 15 can be displayed.

Note that, for example, by operating the evaluation item button 230 or inputting another operation, an evaluation item to be displayed on the GUI 200 can be selected as necessary.

The similar individual display area 220 includes the reference image display area 221 and the reference evaluation value display area 222. The reference image display area 221 displays a reference image selected from the fertile ovum images 15, to which evaluation values are assigned. Evaluation values are to be input with reference to the reference image. In the present embodiment, the similar images 223 are displayed. The similar images 223 are similar to the fertile ovum image 15, whose evaluation values are to be predicted. The similar images 223 are continuously displayed in time series. A user can input operations for reproducing and stopping similar images 223 and other operations.

The reference evaluation values assigned to the similar images 223 are displayed in the reference evaluation value display area 222. In the present embodiment, the reference-waveform-of-change 224, which shows the change-in-time of the reference evaluation values, is displayed. When the similar images 223 are reproduced in time series, the time-display bar 225 displayed on the graph moves. For example, where the time-display bars 214 and 225 are set at the same position, the image can be compared with one another and the evaluation values can be compared with one another.

As shown in FIG. 6, in the present embodiment, the plurality of similar images 223 are displayed in the reference image display area 221. Each of the similar images 223 has a high degree of variation to the labeled fertile ovum images 15. For example, the plurality of similar images 223 may be arrayed in the descending order of degree of variation.

A user can select a similar image 223 to see, which is to be enlarged and displayed in the reference image display area 221. The reference-waveform-of-change 224 of the evaluation values, which are assigned to the selected similar image 223, are displayed in the reference evaluation value display area 222.

Further, as shown in FIG. 6, assignment information on the assigned reference evaluation values may be displayed. In the example of FIG. 6, information of an embryologist or a bio-specialist (Mr. A), who assigned the reference evaluation values, is displayed. Alternatively, the assigned date/time or other information may be displayed. Since such assignment information is displayed, for example, a user can recognize the difference or gap between the evaluation values assigned by another user and the evaluation values assigned by the user. As a result, variation of assigned evaluation values can be reduced.

The slider 235 is displayed at the position corresponding to the grade of the evaluation value or other information. The slider 235 is, for example, used to input evaluation values, correct predicted evaluation values, and the like. For example, the time-display bar 214 is at the position of the developing stage of the displayed fertile ovum image 15 in the graph. The slider 235 is at the position corresponding to one of the predicted evaluation values, which crosses the time-display bar 214. For example, by moving the slider 235 up-and-down, the predicted evaluation value can be corrected. Note that, where the similar individual is selected, the slider 235 can be displayed at the position corresponding to the reference evaluation value. Further, by operating the slider 235, the reference evaluation value can be corrected.

As shown in FIG. 6, the similar images 215, which were selected from the unlabeled fertile ovum images 15, may be displayed in the target-image display area 211. At this time, the plurality of fertile ovum images 15, which are similar to each other, are selected as an unlabeled image group whose evaluation values are to be predicted.

Predicted evaluation values are calculated for each of the images to be predicted in the unlabeled image group. A fertile ovum image 15 is selected from the unlabeled image group as necessary. Therefore a different predicted-waveform-of-change 213 is displayed in the predicted evaluation value display area 212 as necessary. Where the unlabeled image group is displayed, the plurality of fertile ovum images 15 can be labeled simultaneously. Note that how to select the unlabeled similar images 215 will be described later with reference to the block diagram of FIG. 15.

An example of how to input evaluation values by using the GUI-for-inputting-evaluation-values 200 will be described. The predicted evaluation values (the predicted-waveform-of-change 213) displayed on the GUI 200 as they are can be input as evaluation values. For example, a user touches, e.g., double-clicks, the predicted evaluation value display area 212 in which the predicted evaluation values are displayed, selects a predetermined button (not shown), or inputs another operation. As a matter of course, operations other than those may be employed.

Also, the predicted evaluation values displayed on the GUI 200 can be corrected, and the corrected values can be input as evaluation values. The corrected predicted evaluation values are displayed as the correction label 216.

For example, a user moves the time-display bar 214. When a user is watching the motion picture of the fertile ovum images 15 and wants to correct a predicted evaluation value, then he stops the time-display bar 214 at the corresponding position. He moves the slider 235, which stays at the position corresponding to the predicted evaluation value, to the position corresponding to the desired evaluation value. As a result, the predicted-waveform-of-change 213 is corrected, and the correction label 216 is displayed. Note that an operation to correct predicted evaluation values is not limited. Alternatively, the predicted-waveform-of-change 213 may be corrected directly. After correcting the predicted-waveform-of-change 213, an operation to select the correction label 216 as the waveform-of-change 16 of the fertile ovum images 15 is input.

Also, evaluation values can be sequentially input in time series for the plurality of fertile ovum images 15 reproduced in time series. For example, the slider 235 is moved up-and-down where the fertile ovum images 15 are being reproduced from the start point in time series. As a result, the evaluation values corresponding to the moving slider 235 are input as evaluation values in time series. Note that an evaluation value corresponding to the position of the slider 235, at the time when one of the fertile ovum images 15 is displayed, is the evaluation value for this fertile ovum image 15.

Similar unlabeled image groups can be labeled simultaneously. For example, where a predetermined operation to label simultaneously is input, evaluation values are input for one fertile ovum image 15. The input evaluation values are applied to the other similar images 215. Alternatively, evaluation values may be input for one fertile ovum image 15, and then an operation to apply the evaluation values to the other similar images 215 may be input.

Also, evaluation values can be input by using the reference evaluation values (the reference-waveform-of-change 224) for the similar image 223 displayed in the reference image display area 221 as a reference image. For example, the reference evaluation values displayed in the reference evaluation value display area 222 as they are can be input as evaluation values.

As schematically shown by the arrow of FIG. 6, the reference-waveform-of-change 224 displayed in the reference evaluation value display area 222 is dragged-and-dropped and moved to the predicted evaluation value display area 212. The reference-waveform-of-change 224, which has been moved, is displayed as the correction label 216, for example. An operation to select the correction label 216 as evaluation values is input.

A user can compare and examine the reference-waveform-of-change 224, which has been dragged, and the predicted-waveform-of-change 213 very well. Note that the reference-waveform-of-change 224 can be selected as evaluation values without being moved.

Also, the reference evaluation values can be corrected, and the corrected values can be input as evaluation values. For example, with reference to the reference-waveform-of-change 224 moved to the predicted evaluation value display area 212, an operation to correct an evaluation value is input by using the slider 235 or the like. Then an operation to select the corrected value as an evaluation value is input.

By correcting the reference evaluation values displayed in the reference evaluation value display area 222, the evaluation values already assigned to the reference images can be corrected. For example, where a large number of evaluation values are input, a criterion for inputting evaluation values can be changed or a skill of inputting evaluation values can be enhanced. By reviewing and correcting evaluation values already input, the accuracy of evaluation of the fertile ovum 5 can be increased. Further, the difference between evaluation values by one user and another user can be corrected, the difference of evaluation values in the entire system can thus be reduced, and the reliability of evaluation of a fertile ovum can be increased.

Since evaluation values are to be assigned to a large number of fertile ovum images 15, it takes great time and effort to observe the respective fertile ovum images 15 and to input evaluation values. The assist system 150 displays the GUI-for-inputting-evaluation-values 200, which displays not only the fertile ovum images 15, for which evaluation values are to be input, but also predicted evaluation values and reference evaluation values. As described above, various kinds of evaluation values can be input by using the GUI 200. As a result, it is possible to satisfactorily assist a user to input evaluation values and to satisfactorily reduce time and effort to input evaluation values. Further, it is possible to assign evaluation values accurately and to increase the accuracy of evaluation of a fertile ovum.

The display configuration or the like of the GUI-for-inputting-evaluation-values 200 is not particularly limited and can be designed arbitrarily. Further, a method of inputting evaluation values by using the GUI 200, an operation method for inputting evaluation values, and the like are not limited and can be designed arbitrarily.

[Operation of Assist System]

Figure 7:
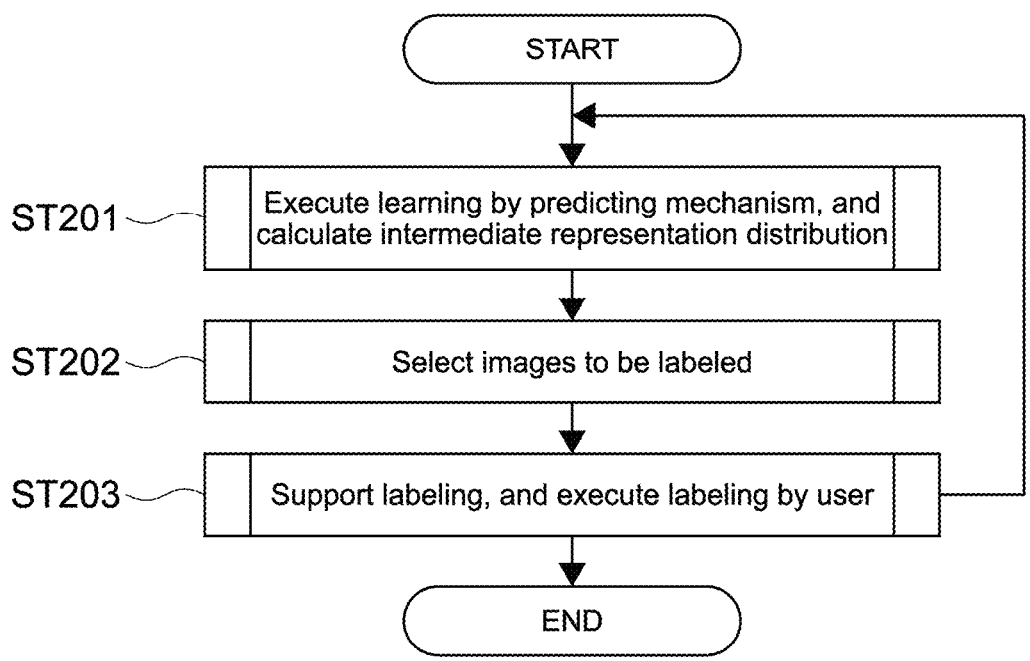
FIG. 7 is a flowchart showing an example of the overall operation of the assist system.

FIG. 7 is a flowchart showing an example of the overall operation of the assist system 150 of the present embodiment. First, the predicting mechanism executes learning, and the intermediate representation distribution is calculated (Step 201). Typically, this processing is executed at a time when the fertile ovum images 15 are added into the labeled image DB 70a or the unlabeled image DB 70b. In other words, this processing is executed at a time immediately after labeling by a user, immediately after capturing the fertile ovum images 15, and the like.

Figure 8:
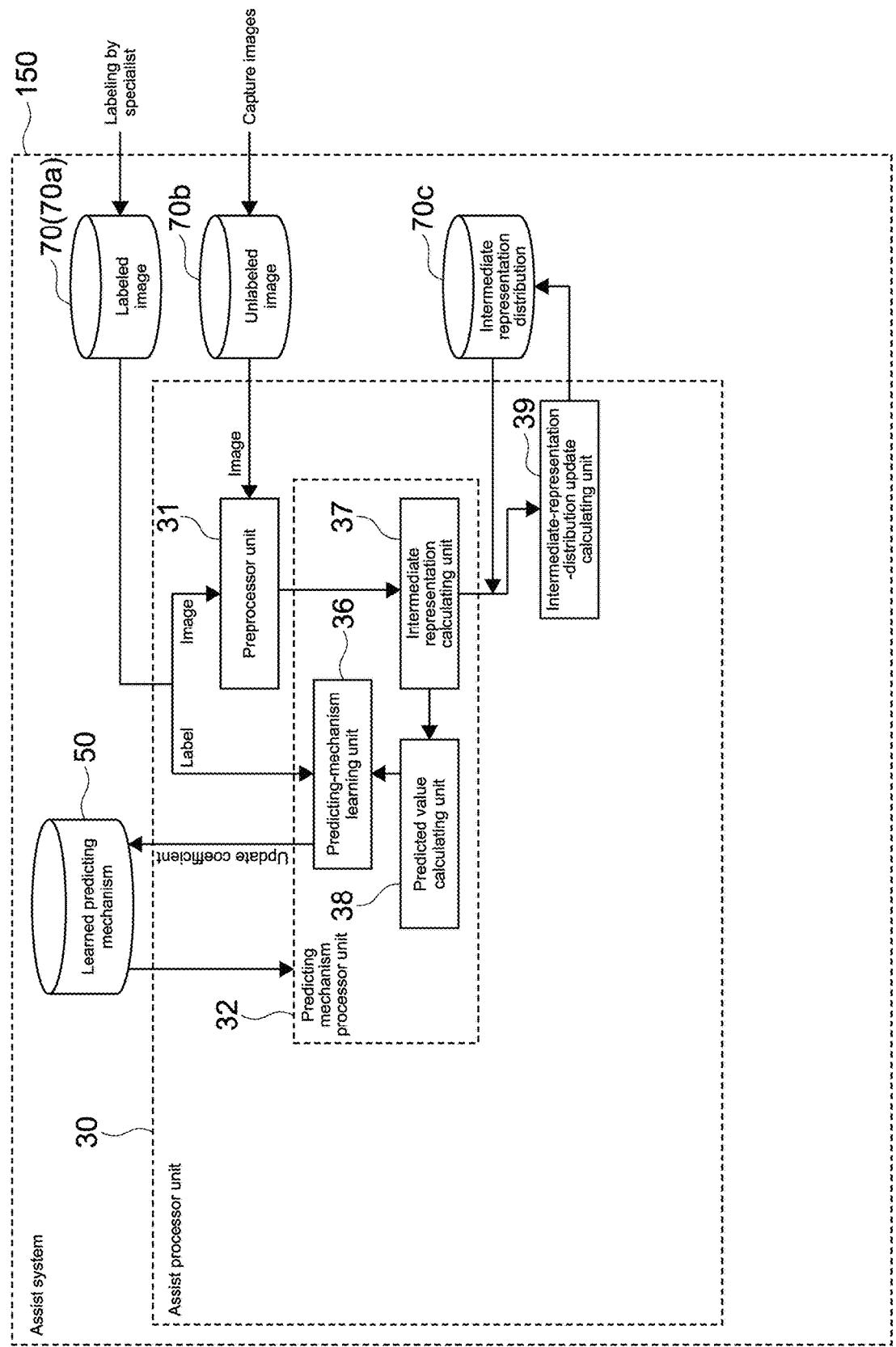
FIG. 8 is a diagram showing the essential blocks for executing learning by the predicting mechanism and for calculating the intermediate representation distribution.
Figure 9:
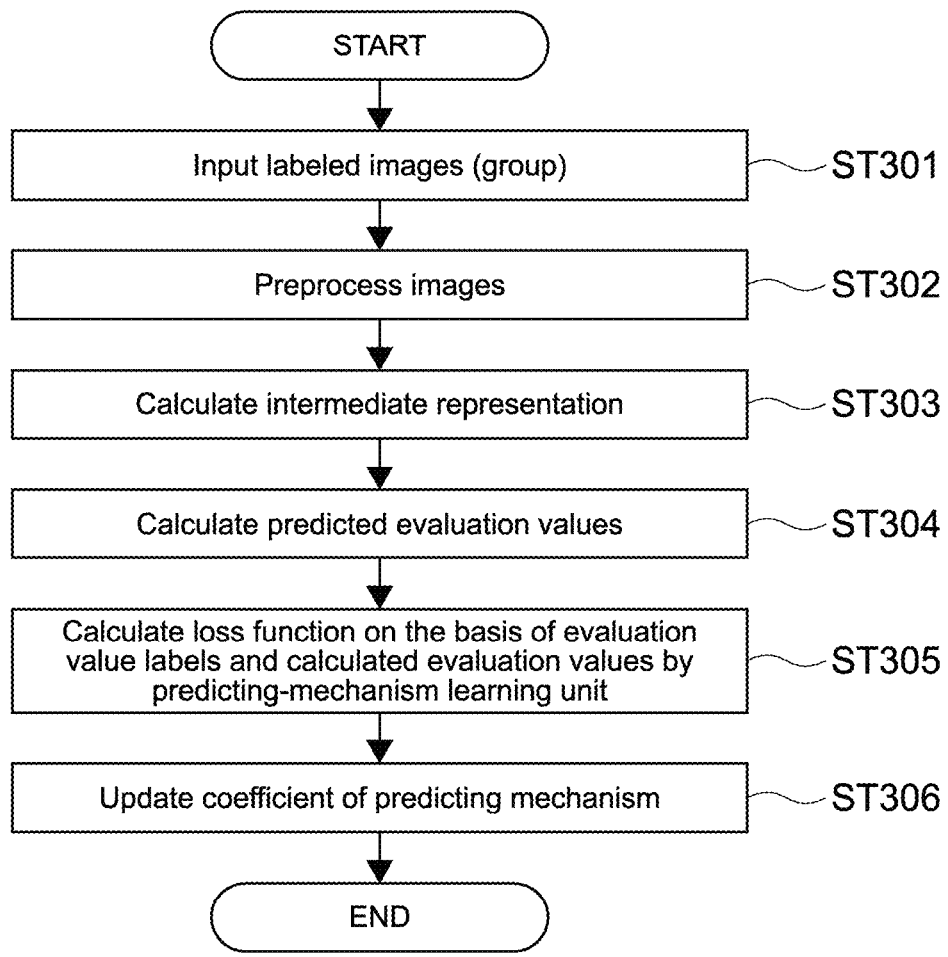
FIG. 9 is a flowchart of executing supervised learning.
Figure 10:
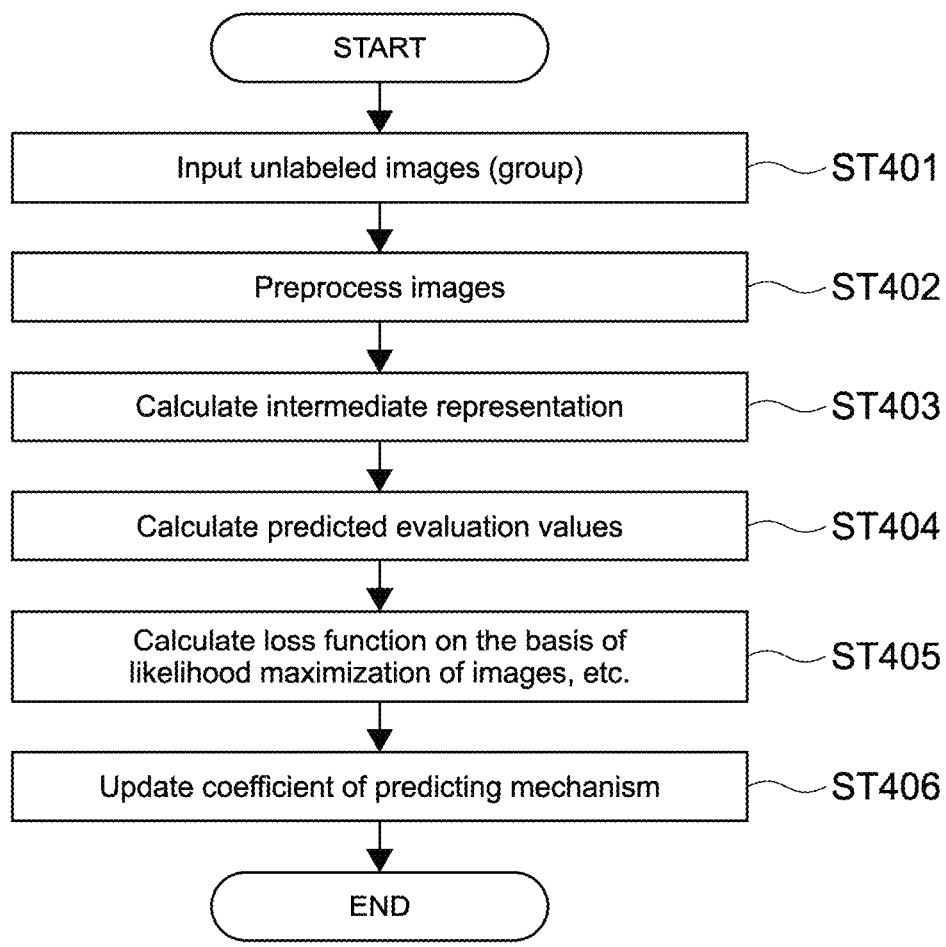
FIG. 10 is a flowchart showing an example of learning by the predicting mechanism based on the unlabeled images.

FIG. 8 is a diagram showing the essential blocks for executing learning by the predicting mechanism and for calculating the intermediate representation distribution. Each of FIG. 9 and FIG. 10 is a flowchart showing an example of learning by the predicting mechanism. FIG. 9 is a flowchart of executing supervised learning. Labeled images (group of images in time series) are input in the predicting mechanism (the predicting mechanism processor unit 32 and the learned predicting mechanism 50) (Step 301), and the preprocessor unit 31 preprocesses the labeled images (Step 302).

The intermediate representation calculating unit 37 calculates intermediate representation (Step 303). The predicted value calculating unit 38 calculates predicted evaluation values (Step 304). The predicting-mechanism learning unit 36 calculates a loss function on the basis of the predicted evaluation values and assigned labels (Step 305). The coefficient of the predicting mechanism is updated with the calculated loss function value (Step 306).

FIG. 10 is a flowchart showing an example of learning by the predicting mechanism based on the unlabeled images. Predicted evaluation values are calculated for the unlabeled images (group of images in time series) (Steps 401 to 404). A loss function is calculated on the basis of likelihood maximization of the images, etc., and the coefficient of the predicting mechanism is updated with the calculated value (Steps 405, 406).

One of the two types of processing of FIG. 9 and FIG. 10 is executed as necessary depending on whether the fertile ovum images 15 input in the predicting mechanism are labeled images or unlabeled images. Therefore it is possible to execute semi-supervised learning, i.e., a learning framework which realizes learning also on the basis of unlabeled images. As a result, it is possible to construct a high-performance predicting mechanism even with a small number of labeled images, and to reduce the cost of labeling the fertile ovum images 15.

Figure 11:
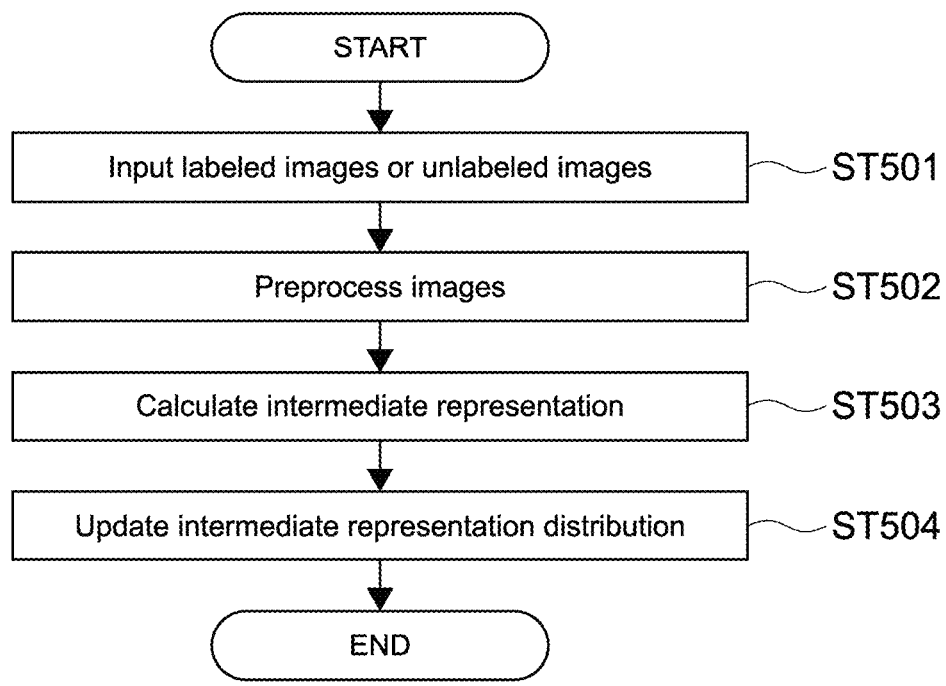
FIG. 11 is a flowchart showing an example of how to calculate intermediate representation distribution.

FIG. 11 is a flowchart showing an example of how to calculate intermediate representation distribution. Labeled images or unlabeled images are input (Step 501). The input images are preprocessed, and intermediate representation is calculated (Steps 502, 503). The intermediate-representation-distribution update calculating unit 39 updates the already-calculated intermediate representation distribution with a distribution including the new intermediate representation (Step 504). As described above, every time new fertile ovum images 15 are added into the DBs, the intermediate representation distribution is updated.

Figure 12:
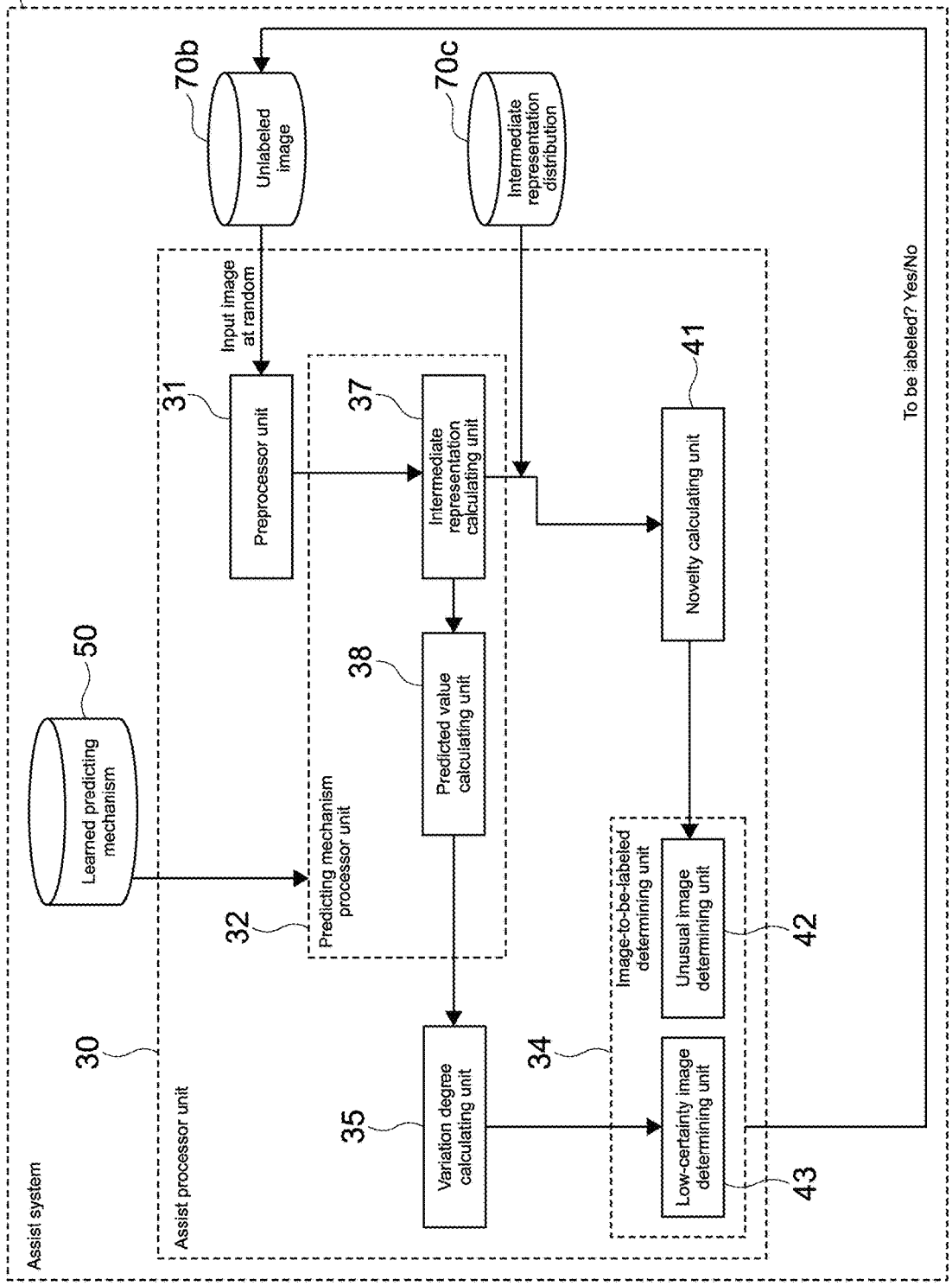
FIG. 12 shows the essential blocks for selecting images-to-be-labeled.

Next, the fertile ovum images 15 to be labeled (hereinafter, referred to as images-to-be-labeled) are selected (Step 202). FIG. 12 shows the essential blocks for selecting images-to-be-labeled.

In the present embodiment, images having unusual features are selected on the basis of the intermediate representation distribution, i.e., the distribution of the feature amount of images. Accordingly, never-labeled-types of images are to be labeled preferentially. The predicting mechanism can execute learning efficiently where assigned labels are used as supervisory data for a machine learning algorithm.

Figure 13:
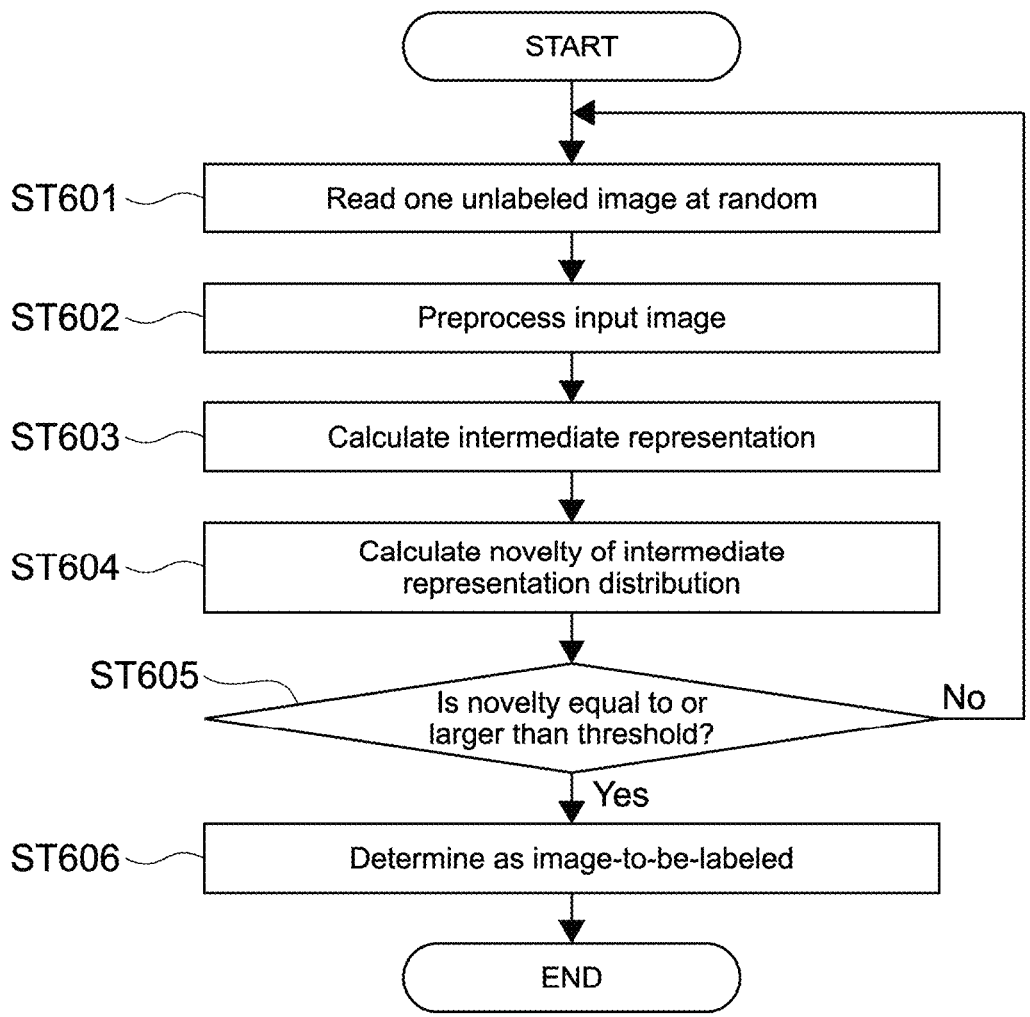
FIG. 13 is a flowchart showing an example of processing based on novelty of the fertile ovum images.

FIG. 13 is a flowchart showing an example of processing based on novelty of the fertile ovum images 15. An unlabeled image in the unlabeled image DB 70b is selected at random (Step 601). The selected unlabeled image is preprocessed, and intermediate representation is calculated (Steps 602, 603).

The novelty calculating unit 41 calculates novelty of the fertile ovum images 15 (Step 604). For example, the probability value of the intermediate representation of the intermediate representation distribution is calculated as novelty as it is. As a matter of course, alternatively, for example, calculation may be executed, e.g., the probability value is multiplied by a predetermined coefficient.

The unusual image determining unit 42 determines if the calculate novelty is equal to or larger than a predetermined threshold or not (Step 605). Where the novelty is smaller than the threshold (Step 605, No), the process returns to Step 601. The process is repeated until an unlabeled image, whose novelty is equal to or larger than the threshold, is obtained. Where the novelty is equal to or larger than the threshold (Step 605, Yes), the unlabeled image is determined as an image-to-be-labeled, which is to be labeled (Step 606).

Note that a method of selecting an image-to-be-labeled on the basis of novelty is not particularly limited. For example, the image having the greatest novelty may be selected as an image-to-be-labeled from all the unlabeled images. Alternatively, the intermediate representation distribution may be clustered on the basis of a predetermined index, and an image distant from the center of each cluster may be selected. In the present embodiment, the image selected on the basis of novelty corresponds to a distinctive image, the distinctive image being selected with reference to an image, the predicted evaluation values having been assigned to the image.

Figure 14:
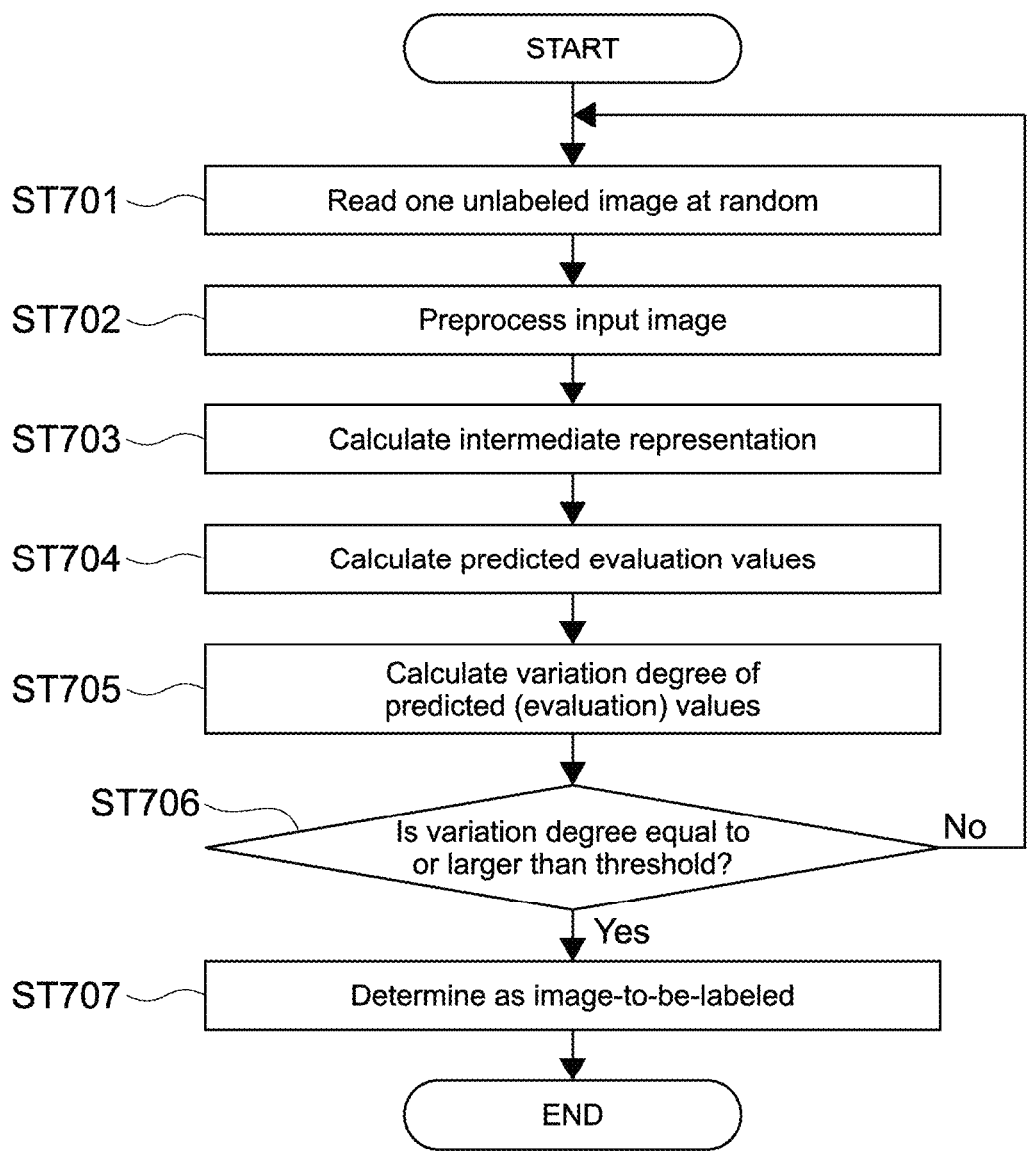
FIG. 14 is a flowchart showing an example of processing based on the certainty of the predicted evaluation values.

FIG. 14 is a flowchart showing an example of processing based on the certainty of the predicted evaluation values of the fertile ovum images 15. For example, a fertile ovum image 15, whose predicted evaluation value calculated by the predicting mechanism has a low certainty, is preferentially selected, and the label of this fertile ovum image 15 is used as supervisory data. As a result, it is possible to construct a predicting mechanism with a high degree of accuracy.

An unlabeled images in the unlabeled image DB 70b is selected at random, and predicted evaluation values are calculated (Steps 701 to 704). The variation degree calculating unit 35 calculates the variation degree of the predicted evaluation values (Step 705). In Step 704, predicted values are calculated on the basis of the probability values of the grades, e.g., (A grade: 30%), (B grade: 34%), and (C grade: 36%).

In Step 705, the variation degree of the probability values of the grades is calculated on the basis of, for example, the following formula, i.e., variation degree=1/(greatest probability-second greatest probability). In the case of the above-mentioned probability values, variation degree=1/(36−34)

=1/2 is obtained. The higher the variation degree, the lower the certainty of the predicted evaluation values. Note that the method of calculating the variation degree is not limited to this.

The low-certainty image determining unit 43 determines whether the variation degree is equal to or larger than a predetermined threshold or not (Step 706). Where the variation degree is smaller than the threshold (Step 706, No), the process returns to Step 701. The process is repeated until an unlabeled image, whose variation degree is equal to or larger than the threshold, is obtained. Where the variation degree is equal to or larger than the threshold (Step 706, Yes), the unlabeled image is determined as an image-to-be-labeled (Step 707). Note that an image-to-be-labeled can be selected on the basis of a parameter such as unreliability and ambiguousness (uncertainty) of predicted evaluation values instead of the variation degree.

With reference to FIG. 7 again, labeling is supported, and a user executes labeling (Step 203).

Figure 15:
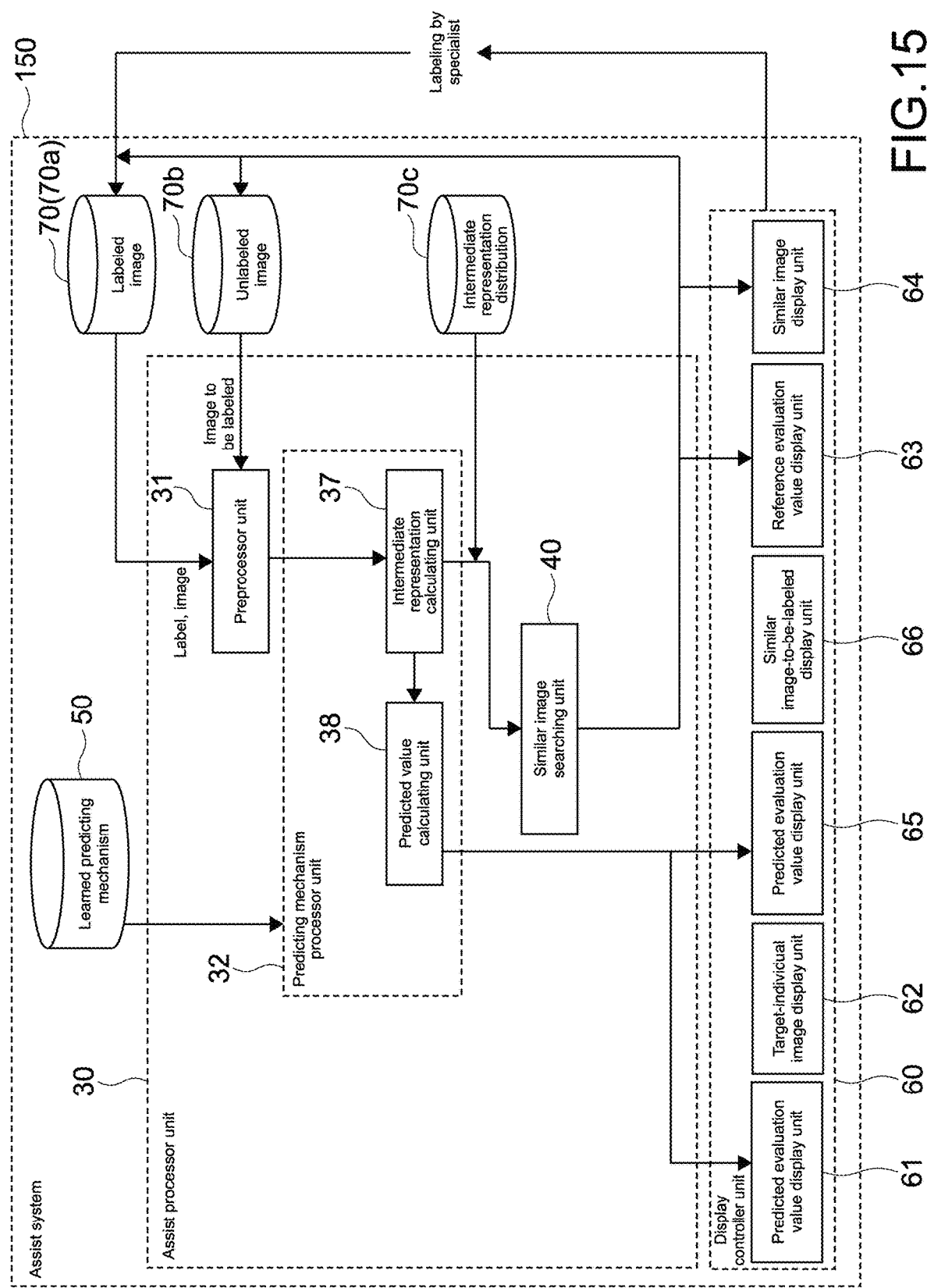
FIG. 15 is a diagram showing essential blocks for executing support for labeling.
Figure 16:
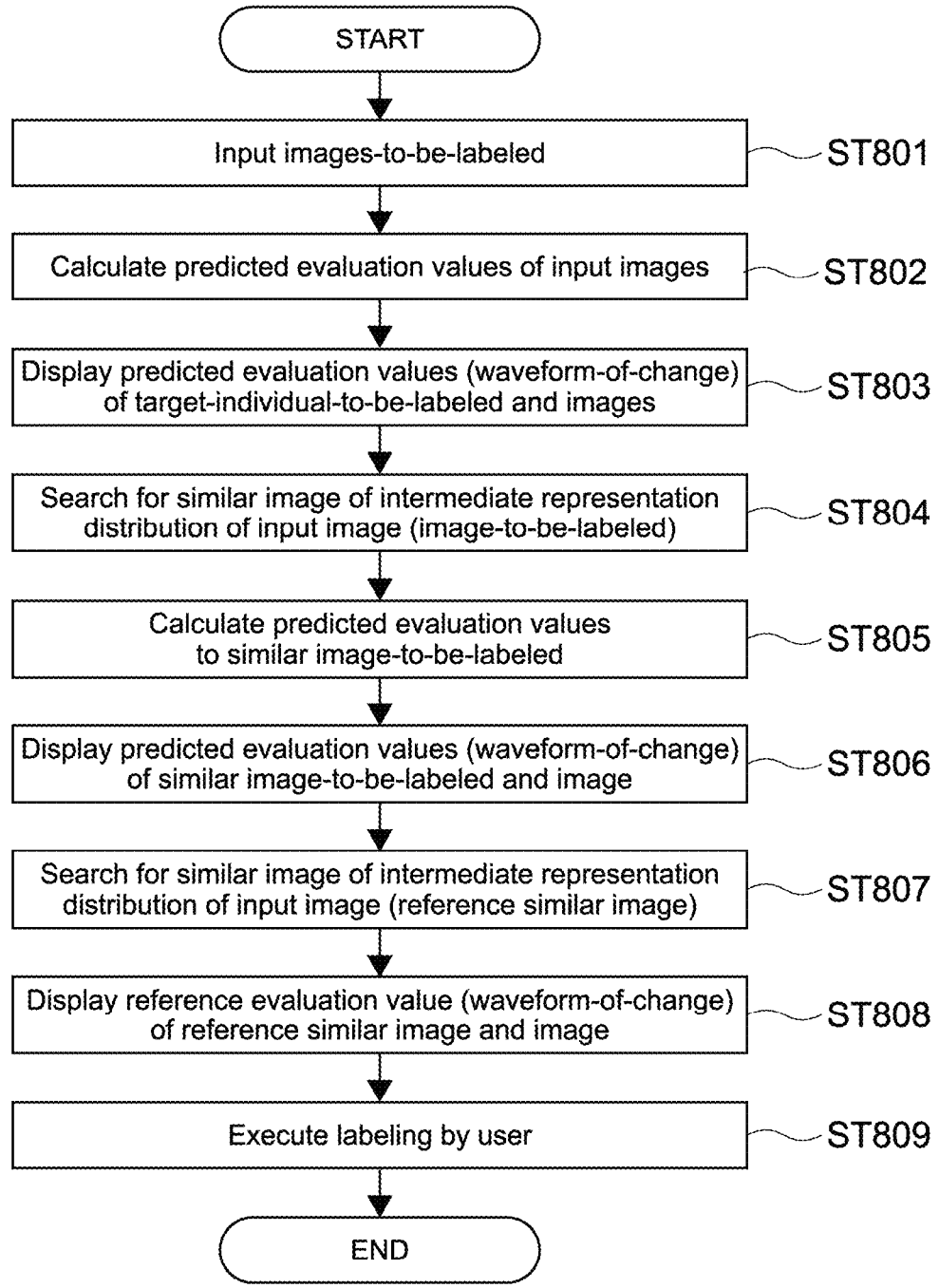
FIG. 16 is a flowchart showing an example of the process of support for labeling.

FIG. 15 is a diagram showing essential blocks for executing support for labeling. FIG. 16 is a flowchart showing an example of the process of support for labeling. In the present embodiment, the GUI-for-inputting-evaluation-values 200 of FIG. 6 is generated and displayed to support for labeling.

The images-to-be-labeled selected in Step 202 are input (Step 801). The images are preprocessed, the intermediate representation is calculated, and then the predicted evaluation values are calculated (Step 802). The predicted evaluation value display unit 61 and the target-individual image display unit 62 display the predicted evaluation values (the predicted-waveform-of-change 213) of the target-individual and the fertile ovum images 15 on the GUI 200, respectively (Step 803).

The similar image searching unit 40 searches for similar images, which are similar to the fertile ovum images 15 of the target-individual. Firstly, the unlabeled image DB 70*b* is searched for a plurality of similar images (referred to as similar images-to-be-labeled) as the target-individual to be labeled (Step 804). Predicted evaluation values to the retrieved similar images-to-be-labeled are calculated (Step 805). Then the predicted evaluation value display unit 65 and the similar image-to-be-labeled display unit 66 display the predicted-waveform-of-change 213 and the similar images 215 on the GUI 200, respectively (Step 806).

The similar image searching unit 40 searches the labeled image DB 70*a* for a similar image (referred to as reference similar image) as a reference image (Step 807). Then the reference evaluation value display unit 63 and the reference similar image display unit (similar image display unit of FIG. 1) 64 display the reference predicted evaluation values (the reference-waveform-of-change 224) and the similar images 223 on the GUI 200, respectively (Step 808).

Labeling is executed by using the GUI-for-inputting-evaluation-values 200 by a user. In other words, the evaluation values in time series is input to each evaluation item (Step 809). According to the assist system 150, it is possible to satisfactorily assist a user to input evaluation values and to satisfactorily reduce time and effort to input evaluation values.

Figure 17:
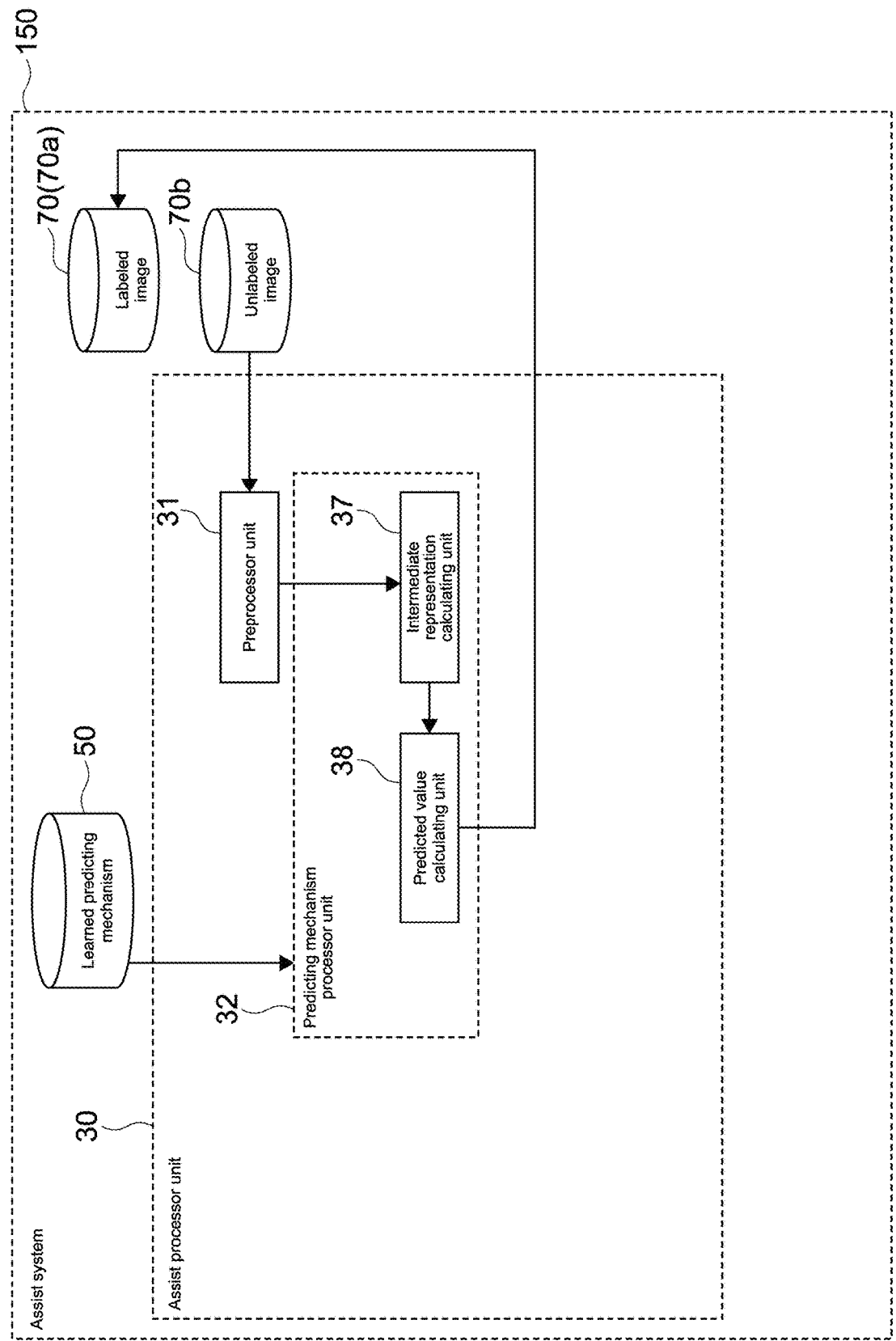
FIG. 17 is a diagram showing the essential blocks for executing automatic labeling.
Figure 18:
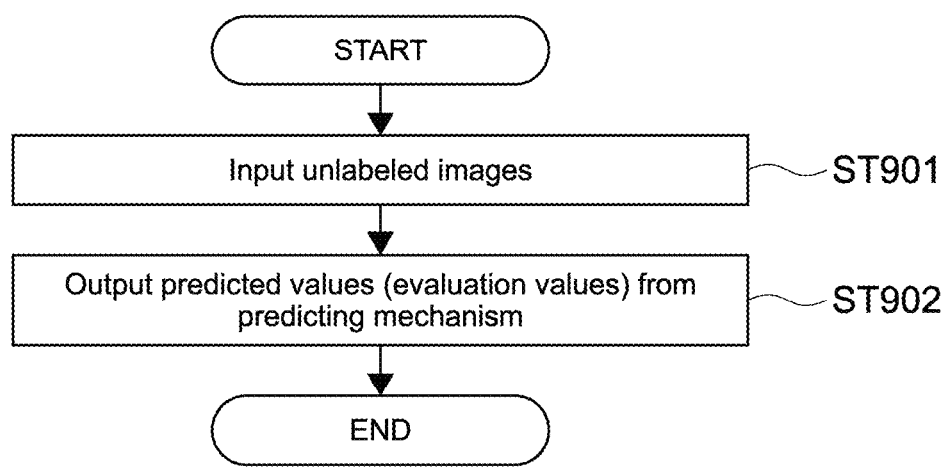
FIG. 18 is a flowchart showing an example of processing of the automatic labeling.

FIG. 17 is a diagram showing the essential blocks for executing automatic labeling. FIG. 18 is a flowchart showing an example of processing of the automatic labeling. Where the performance of the predicting mechanism is higher than a predetermined level, it is possible to automatically assign an evaluation value to each evaluation item. In other words, the captured fertile ovum images (images in time series) 15 are input (Step 901), and the predicting mechanism outputs the predicted values as they are as the evaluation values (Step 902). As a result, a user does not need to input evaluation values, and it is possible to greatly reduce the cost of labeling.

Note that the predicted values (evaluation values) output from the predicting mechanism may be displayed on the display device 4, and a user may confirm and correct the predicted values, for example.

Figure 19:
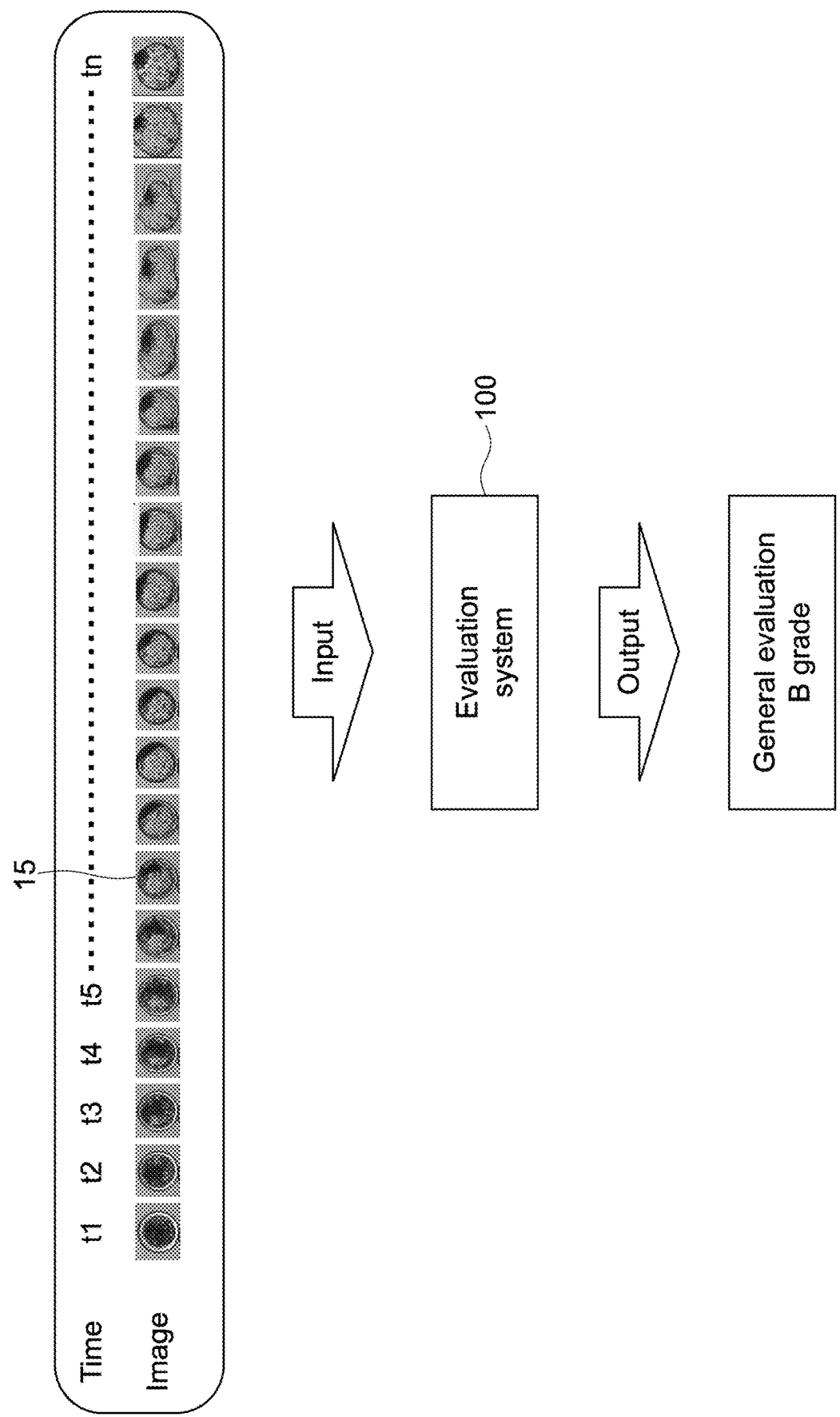
FIG. 19 is a diagram schematically illustrating how the evaluation system automatically calculates general evaluations.

FIG. 19 is a diagram schematically illustrating how the evaluation system 100 of the present technology automatically calculates general evaluations. Where it is possible to automatically assign an evaluation value to each evaluation item, it is possible to execute general evaluations of the fertile ovum automatically by inputting the plurality of fertile ovum images 15 in time series in the evaluation system 100. As a result, it is possible to easily evaluate the fertile ovum images with a high degree of accuracy.

According to the evaluation system of the present embodiment, the assist system 150 assigns the evaluation values according to a machine learning algorithm. As a result, it is possible to evaluate a fertile ovum comprehensively or systematically from the viewpoint of the fact which combination of factors out of various factors of information on the appearance of the fertile ovum affects and how the combination affects. This evaluation is more comprehensive or systematic than the evaluation on the basis of predefined evaluation parameters (for example, degree of uniformity of cell-division, and rate of fragmentation) and other parameters. For example, a new evaluation parameter can be extracted, and a plurality of evaluation parameters can be weighed. As a result, it is possible to evaluate a fertile ovum with a high degree of accuracy.

Further, it is not necessary to review the system configuration and to manually obtain a necessary feature amount every time revising the kind of evaluation values. Therefore the system configuration is versatile, and the total cost of the system configuration can be reduced.

OTHER EMBODIMENTS

The present technology is not limited to the above-mentioned embodiments, and other various embodiments are realized.

Figure 20A:
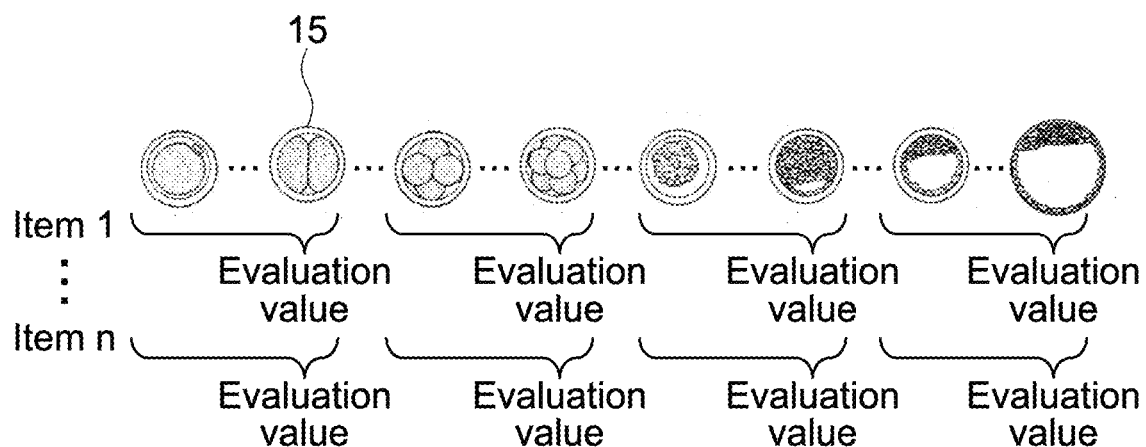
FIG. 20A is a diagram illustrating another example of how to assign evaluation values in time series to each evaluation item.
Figure 20B:
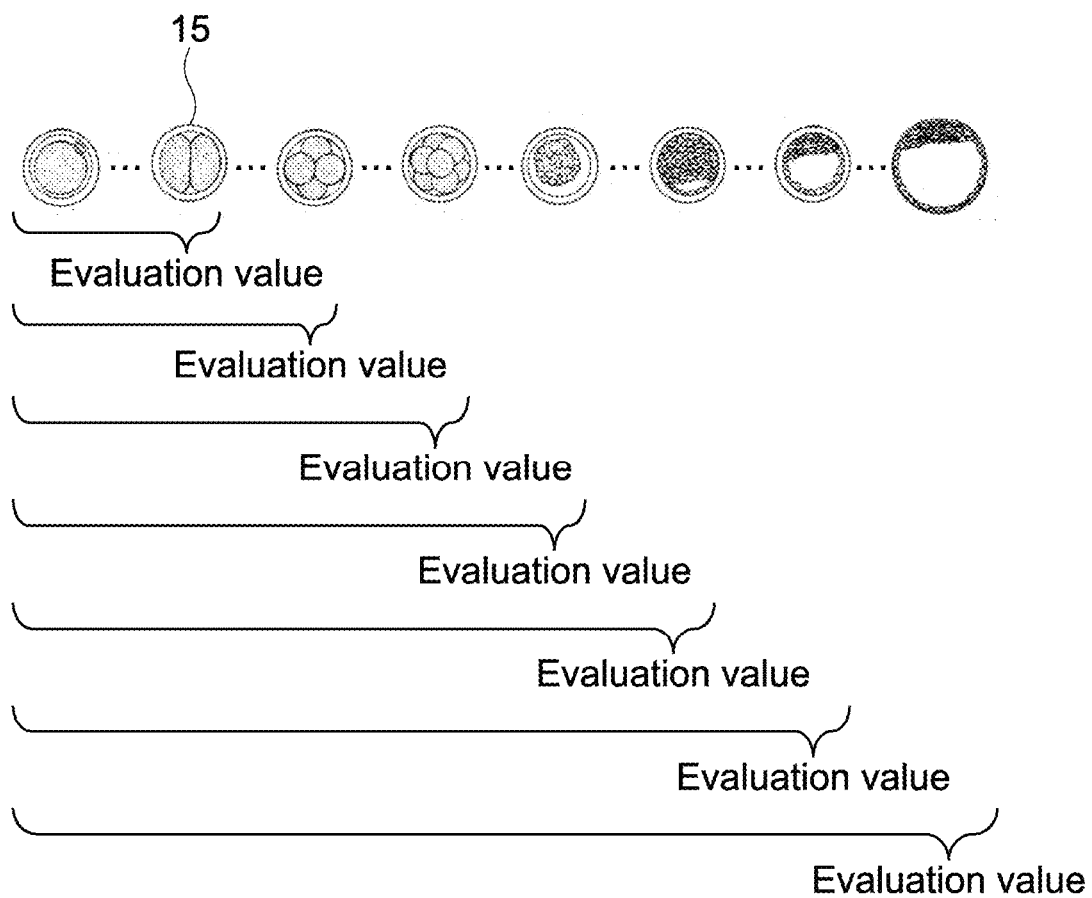
FIG. 20B is a diagram illustrating another example of how to assign evaluation values in time series to each evaluation item.

Each of FIG. 20A and FIG. 20B is a diagram illustrating another example of how to assign evaluation values in time series to each evaluation item. In the above-mentioned embodiments, evaluation values are assigned for the plurality of fertile ovum images 15 captured in time series, one by one.

Not limited to the above, for example, as shown in FIG. 20A, an evaluation value may be assigned to each evaluation item for each image group, the image group including the plurality of fertile ovum images 15 sequentially captured in time series. A plurality of evaluation values assigned for the image groups as units, respectively, is also a kind of evaluation values in time series.

General evaluation of a fertile ovum is executed on the basis of the change-in-time of the plurality of evaluation values assigned for the image groups (waveform-of-change). Note that the number of fertile ovum images in one image group is not particularly limited, and may be determined as necessary. Since evaluation values are assigned for each image group, it is possible to reduce the number of labels and the cost of labeling.

Note that the assist system 150 described in the second embodiment is applicable also to the embodiment in which evaluation values are assigned for each image group. Predicted evaluation values may be calculated, a similar image group may be selected, reference evaluation values may be displayed, and other processing may be executed, for each image group. A user can input evaluation values for each image group by using a GUI-for-inputting-evaluation-values.

A method of modeling data in time series may be used to execute machine learning on the basis of each image group. For example, the above-mentioned RNN and, particularly, the DNN modeling method in time series using LSTM (Long Short Term Memory) are effective.

As shown in FIG. 20B, according to another possible embodiment, each image group includes images from the start point in time series to a predetermined developing stage, and evaluation values may be assigned for each image group. Such an evaluation value is also a kind of the evaluation values in time series. Further, the assist system of the present technology can also support for inputting evaluation values for each image group.

As described above, the assist system of the present technology is used to mainly assign evaluation items before implantation. Not limited to the above, the assist system may calculate predicted values about evaluation items after implantation (progress after implantation, conception rate, progress of pregnancy, progress of calving, progress of postcalving, growth of calf, breeding value of grown-up cattle, etc.).

Figure 21:
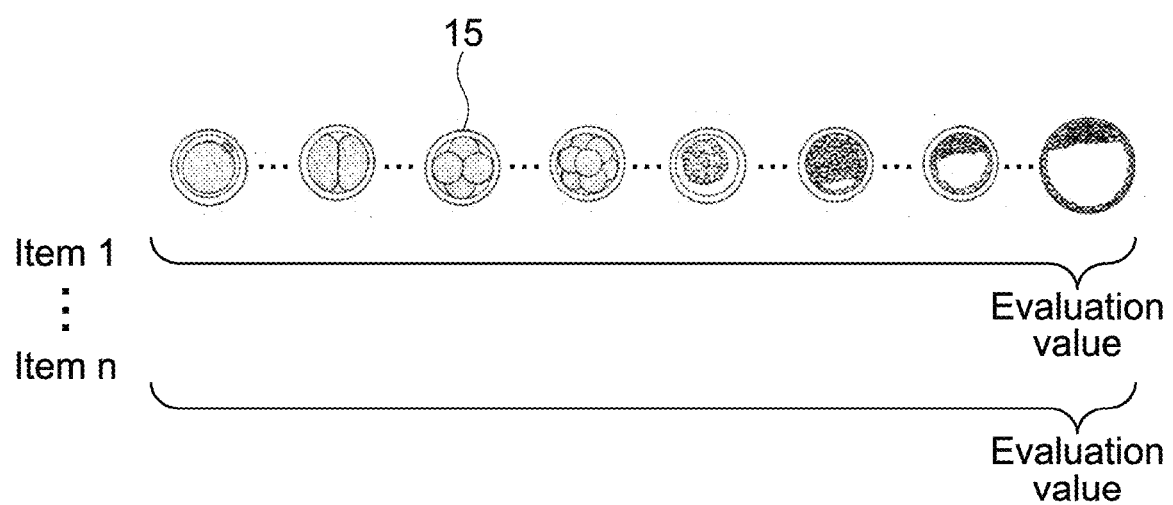
FIG. 21 is a diagram illustrating an example of how to assign evaluation values for fertile ovum images.

As shown in FIG. 21, the assist system of the present technology can be applicable to predicting an evaluation value to each evaluation item for all the plurality of fertile ovum images 15 captured in time series. In other words, one evaluation value is calculated to each evaluation item. A fertile ovum may be evaluated on the basis of such evaluation values.

The general evaluation of a fertile ovum on the basis of the waveform-of-change 16 of FIG. 4 and the general evaluation of a fertile ovum executed with the whole of a plurality of fertile ovum images as a unit as shown in FIG. 21 may be used in combination. A hybrid predicting mechanism capable of executing both kinds of the general evaluation may be realized. Such hybrid predicting mechanism is capable of evaluating a fertile ovum with a high degree of accuracy.

Figure 22:
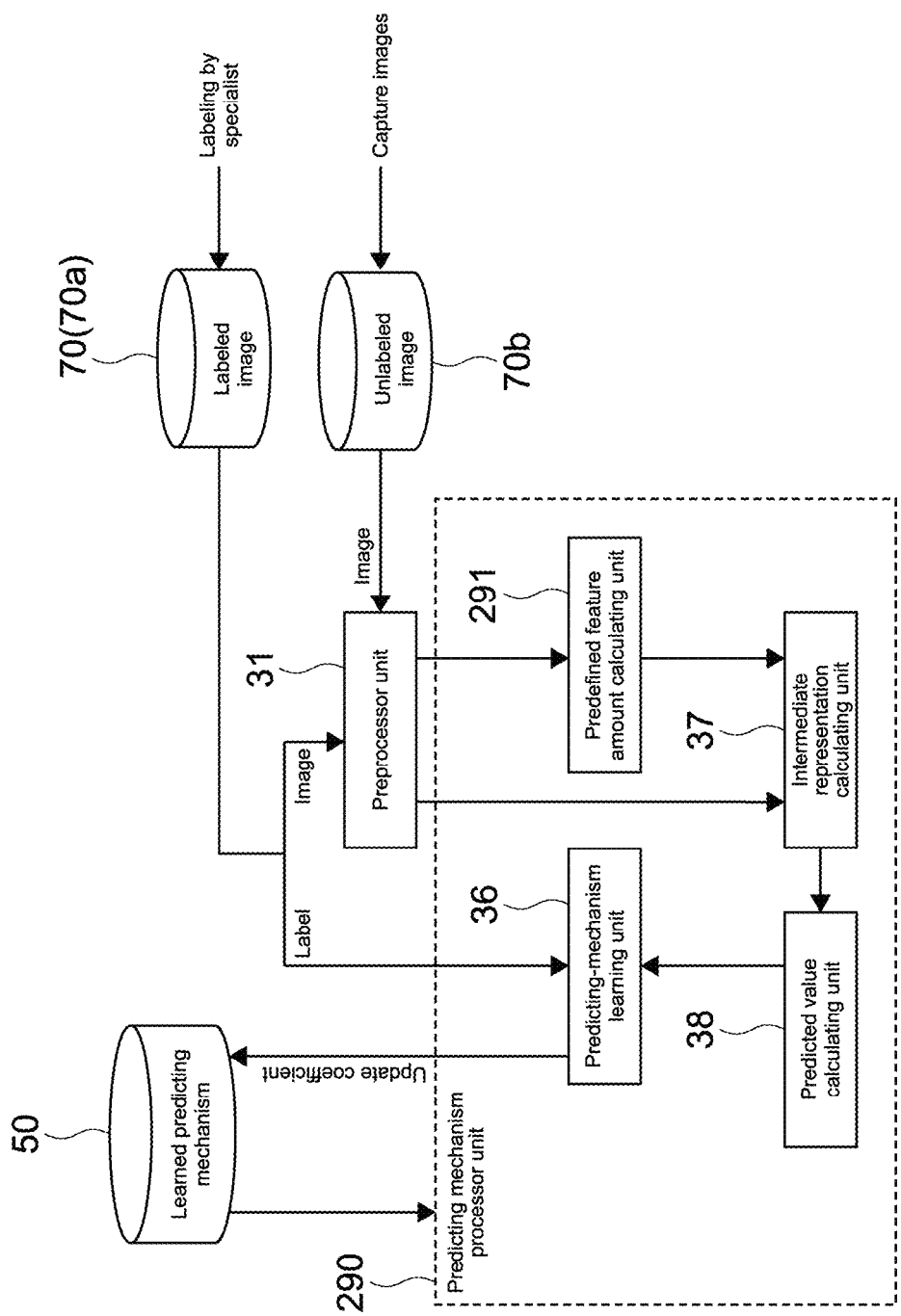
FIG. 22 is a block diagram showing another configuration example of the predicting mechanism processor unit.

FIG. 22 is a block diagram showing another configuration example of the predicting mechanism processor unit. The predicting mechanism processor unit 290 includes the predefined feature amount calculating unit 291. The predefined feature amount calculating unit 291 calculates a previously-known effective image feature. This calculated image feature and the preprocessed fertile ovum image are input in the predicting mechanism. As a result, it is possible to provide high performance even at a less-labeled stage.

Examples of the previously-known effective image feature include uniformity of cell-division, rate of fragmentation, and the like. A hybrid predicting mechanism capable of executing the evaluation on the basis of this predefined feature and the comprehensive or systematic evaluation based on a machine learning is realized. Such hybrid predicting mechanism is capable of evaluating a fertile ovum with a high degree of accuracy.

In the example of FIG. 22, a method (early fusion) of fusing the result of calculating the predefined feature amount and the result of preprocessing the images, at an early stage, is executed. Not limited to the above, a method (late fusion) of fusing them after evaluation values are calculated on the basis of the image preprocess input, a method (slow fusion) of gradually fusing them, or another arbitrary fusing method may be executed. According to each method, at first, the evaluation value predicting performance is only based on a predefined feature amount. The larger the number of labels, evaluation values are predicted also on the basis of a feature amount, which is not based on a predefined feature amount. Note that a predicting mechanism realized on the basis of previous knowledge may be configured as a predicting mechanism that requires no labeling.

The predicting mechanism may previously learn a public dataset of labeled fertile ovum images. As a result, the predicting mechanism can have a predetermined level of capability of recognizing images at the first stage. As a result, it is possible to provide high performance even at a less-labeled stage.

With regard to assigning an evaluation value to each evaluation item for an image, an evaluation value may be estimated on the basis of the evaluation values before and after the image, and the estimated evaluation value may be assigned for the image. For example, in order to assign evaluation values for the respective fertile ovum images, images-to-be-labeled and an image-to-be-estimated are determined. Evaluation values are assigned only to the images-to-be-labeled. Then evaluation values for the image-to-be-estimated may be estimated on the basis of the evaluation values assigned to the images-to-be-labeled before and after the image-to-be-estimated, and the estimated evaluation values may be assigned. For example, the odd-number fertile ovum images are treated as images-to-be-labeled, and the even-number fertile ovum images are treated as images-to-be-estimated, or the like. As a result, it is possible to reduce the cost of labeling.

Fertile ovum images to be captured may be two-dimensional images, or three-dimensional images with structural information. Two-dimensional images can be captured by using, for example, a stereoscopic microscope, a phase-contrast optical microscope, or another microscope. Three-dimensional images can be captured by using, for example, a confocal microscope, a light-sheet microscope, or another microscope.

Not only a computer system including a single computer but also a computer system including a plurality of cooperative computers can execute the information processing method and the program of the present technology.

Note that, in the present disclosure, the system means a set including a plurality of configurational elements (apparatuses, modules (components), etc.), and it does not matter whether all the configurational elements are in a single case or not. Therefore the system includes a plurality of apparatuses accommodated in different cases and connected to each other via a network. Also, the system includes a single apparatus including a plurality of modules accommodated in a single case.

In executing the information processing method and the program of the present technology by using a computer system, a single computer or each one of different computers, for example, obtains a plurality of fertile ovum images, assigns evaluation values to evaluation items, assigns general evaluation, outputs a GUI-for-inputting-evaluation-values, and the like. Further, a predetermined computer can execute the respective kinds of processing by causing another computer/other computers to execute part of or all the processing and obtaining the results.

In short, the information processing method and the program of the present technology are applicable to a cloud computing configuration, in which a plurality of apparatuses share one function in cooperation via a network.

At least two characteristic parts out of the above-mentioned characteristic parts of the present technology can be executed in combination. In other words, the various characteristic parts described in the embodiments may be arbitrarily combined without distinguishing the embodiments. Further, above-mentioned various effects are merely examples and not limitations, and other effects may be obtained.

Note that the present technology may employ the following configurations.

(1) An embryonic development analysis system, comprising: circuitry configured to: obtain a plurality of embryonic development images captured in a time series; determine, for at least one of the plurality of embryonic development images, a time series of evaluation values for each of a plurality of evaluation items associated with the plurality of embryonic development images; and evaluate a characteristic of cells represented in one or more of the plurality of embryonic development images based, at least in part, on the time series of evaluation values for the plurality of evaluation items.

(2) The embryonic development analysis system of (1), wherein at least some evaluation values in the time series of evaluation values correspond to multiple of the plurality of embryonic development images.

(3) The embryonic development analysis system of (2), wherein at least one of the evaluation values corresponding to multiple of the plurality of embryonic development images corresponds to a time period from a start point in the time series of captured images to a predetermined developing stage of a fertile ovum represented in one or more of the plurality of embryonic development images.

(4) The embryonic development analysis system of (1), wherein the circuitry is further configured to: predict based on the determined time series of evaluation values for the plurality of evaluation items, future values for the plurality of evaluation items; and evaluate the characteristic of the cells based, at least in part, on the predicted future values for the plurality of evaluation items.

(5) The embryonic development analysis system of (4), wherein predicting the future values for the plurality of evaluation items comprises processing the time series of evaluation values for the plurality of evaluation items using a prediction model that incorporates a machine learning algorithm.

(6) The embryonic development analysis system of (5), wherein the prediction model includes a plurality of coefficients used to predict the future values of the plurality of evaluation items, and wherein the circuitry is further configured to update one or more of the plurality of coefficients based on the determined time series of evaluation values for the plurality of evaluation items and/or the predicted future values for the plurality of evaluation items.

(7) The embryonic development analysis system of (6), wherein the circuitry is further configured to: receive quality information about the cells after an embryo associated with the cells has been implanted; and update one or more of the plurality of coefficients based, at least in part, on the received quality information.

(8) The embryonic development analysis system of (6), wherein updating one more of the plurality of coefficients comprises calculating a loss function based on the predicted future values and the time series of determined evaluation values and updating the one or more of the plurality of coefficients based, at least in part, on the calculated loss function.

(9) The embryonic development analysis system of (5), wherein the circuitry is further configured to train the prediction model based, at least in part, on an analysis of one or more unlabeled images.

(10) The embryonic development analysis system of (4), wherein predicting the future values for the plurality of evaluation items comprises: preprocessing an image of the plurality of embryonic development images, wherein preprocessing the image comprises normalizing the image and/or adjusting a position of cells represented in the image; and predicting the future values based, at least in part, on the preprocessed image.

(11) The embryonic development analysis system of (10), wherein predicting the future values for the plurality of evaluation items comprises: calculating, based on the preprocessed image, an intermediate representation in the prediction model; and predicting the future values based, at least in part, on the intermediate representation.

(12) The embryonic development analysis system of (1), wherein the circuitry is further configured to: present a graphical user interface configured to: display the plurality of embryonic development images; and enable a user to specify evaluation values for at least one of the plurality of evaluation items for images in the plurality of embryonic development images.

(13) The embryonic development analysis system of (12), wherein the graphical user interface is further configured to display the plurality of embryonic development images as a time lapse sequence.

(14) The embryonic development analysis system of (1), wherein the circuitry is further configured to automatically determine the time series of plurality of evaluation values for at least one of the plurality of evaluation items.

(15) The embryonic development analysis system of (1), wherein the plurality of evaluation items relate to the cells represented in one or more of the plurality of embryonic development images, and wherein the plurality of evaluation items comprise at least two items selected from the group consisting of size, shape, sphericity, transmissivity, number of cells, degree of uniformity of cell division, symmetry, amount of fragmentation, rate of fragmentation, and time information.

(16) The embryonic development analysis system of (1), wherein evaluating the characteristic of cells represented in one or more of the plurality of embryonic development images comprises evaluating a quality of the cells.

(17) The embryonic development analysis system of (4), wherein the circuitry is further configured to determine for an unlabeled image, an evaluation value for one or more of the plurality of evaluation items, wherein the determination is based, at least in part, on the predicted future values.

(18) The embryonic development analysis system of (1), wherein evaluating a characteristics of cells represented in one or more of the plurality of embryonic development images comprises evaluating a characteristic of an embryo represented in one or more of the plurality of embryonic development images.

(19) An embryonic development analysis method comprising: obtaining a plurality of embryonic development images captured in a time series; determining, for at least one of the plurality of embryonic development images, a time series of evaluation values for each of a plurality of evaluation items associated with the plurality of embryonic development images; and evaluating a characteristic of cells represented in one or more of the plurality of embryonic development images based, at least in part, on the time series of evaluation values for the plurality of evaluation items.

(20) An embryonic development analysis system comprising: an image capture device configured to capture a time series of embryonic development images; a database configured to store the captured time series of embryonic development images; and circuitry configured to: instruct the image capture device to capture the time series of embryonic development images; determine, for at least one of the plurality of embryonic development images, a time series of evaluation values for each of a plurality of evaluation items associated with the plurality of embryonic development images; and evaluate a characteristic of cells represented in one or more of the plurality of embryonic development images based, at least in part, on the time series of evaluation values for the plurality of evaluation items.

Note that the present technology may further employ the following configurations.

(1) An information processing apparatus, including:
an obtaining unit configured to obtain a plurality of images of a cell captured in time series;
an assigning unit configured to assign evaluation values in time series to each of one or more predetermined evaluation items for the plurality of obtained images; and
an evaluating unit configured to evaluate the cell on the basis of a change-in-time of the assigned evaluation values in time series.

(2) The information processing apparatus according to (1), in which
the evaluating unit is configured to evaluate the cell according to a first machine learning algorithm.

(3) The information processing apparatus according to (1) or (2), in which
the assigning unit is configured to assign the evaluation values for each of the plurality of obtained images.

(4) The information processing apparatus according to any one of (1) to (3), in which
the assigning unit is configured to assign the evaluation values for an image group including the plurality of images captured sequentially in time series.

(5) The information processing apparatus according to any one of (1) to (4), in which
the assigning unit includes a predicting unit configured to calculate predicted evaluation values, the predicted evaluation values being predicted values of the evaluation value, and
the information processing apparatus further includes an output unit configured to output a GUI (Graphical User Interface) for inputting the evaluation values, the GUI displaying the predicted evaluation values.

(6) The information processing apparatus according to (5), in which
the evaluating unit is configured to evaluate the cell according to a first machine learning algorithm, and
the predicting unit is configured to calculate the predicted evaluation values according to a second machine learning algorithm.

(7) The information processing apparatus according to (5) or (6), in which
the GUI is capable of executing at least one of
an operation to input the displayed predicted evaluation values as the evaluation values, and
an operation to correct the displayed predicted evaluation values and to input the corrected values as the evaluation values.

(8) The information processing apparatus according to any one of (5) to (7), in which
the GUI is capable of executing an operation to sequentially input the evaluation values in the time series.

(9) The information processing apparatus according to any one of (5) to (8), in which
the predicting unit is configured to select a reference image from the images, the evaluation values having been assigned to the images, and
the GUI is configured to display the selected reference image and display reference evaluation values, the reference evaluation values being assigned to the selected reference image.

(10) The information processing apparatus according to (9) in which
the GUI is capable of executing at least one of
an operation to input the displayed reference evaluation values as the evaluation values, and
an operation to correct the displayed reference evaluation values and to input the corrected values as the evaluation values.

(11) The information processing apparatus according to (9) or (10), in which
the GUI is configured to display a change-in-time of the reference evaluation values assigned to the selected reference image.

(12) The information processing apparatus according to any one of (9) to (11), in which
the predicting unit is configured to select a similar image as the reference image, the similar image being similar to an image whose evaluation values are to be predicted.

(13) The information processing apparatus according to any one of (1) to (12), in which
the assigning unit is configured to select a plurality of images similar to each other as an image group whose evaluation values are to be predicted.

(14) The information processing apparatus according to (6), in which
the assigning unit is configured to select a distinctive image as the image whose evaluation values are to be predicted, the distinctive image being selected with reference to an image, the predicted evaluation values having been assigned to the image, and
the predicting unit is configured to use the evaluation values assigned to the selected distinctive image as supervisory data for the second machine learning algorithm.

(15) The information processing apparatus according to (6), in which
the assigning unit is configured to select an image whose certainty of the predicted evaluation values is lower than certainty of the predicted evaluation values of other images as the image whose evaluation values are to be predicted, and
the predicting unit is configured to use the evaluation values assigned to the selected image having the low certainty of the predicted evaluation values as supervisory data for the second machine learning algorithm.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST 2 image capturing unit
3 fertile ovum information DB 4 display device
5 cell (fertile ovum)
10 information processing apparatus
11 obtaining unit
12 assigning unit
13 evaluating unit
15 fertile ovum image
16 waveform-of-change
17 predicting mechanism
18 predicting-mechanism learning unit
30 assist processor unit
32, 290 predicting mechanism processor unit
33 intermediate-representation processor unit
34 image-to-be-labeled determining unit
60 display controller unit
100 evaluation system
150 assist system
200 GUI-for-inputting-evaluation-values
210 target-individual display area
215 similar image
220 similar individual display area
223 similar image
235 slider

The invention claimed is:

1. An embryonic development analysis system, comprising:
   circuitry configured to:
      obtain a plurality of embryonic development images captured in a time series;
      determine, for at least one of the plurality of embryonic development images, a time series of evaluation values for each of a plurality of evaluation items associated with the plurality of embryonic development images;
      predict based on the determined time series of evaluation values for the plurality of evaluation items, future values for the plurality of evaluation items; and
      output the future values for the plurality of evaluation items.

2. The embryonic development analysis system of claim 1, wherein the circuitry is further configured to:
   present a graphical user interface configured to display the future values for the plurality of evaluation items.

3. The embryonic development analysis system of claim 2, wherein the graphical user interface is further configured to receive a user input to specify evaluation values for at least one of the plurality of evaluation items for images in the plurality of embryonic development images.

4. The embryonic development analysis system of claim 2, wherein the graphical user interface is further configured to display the plurality of embryonic development images.

5. The embryonic development analysis system of claim 4, wherein the graphical user interface is further configured to display the plurality of embryonic development images as a time lapse sequence.

6. The embryonic development analysis system of claim 2, wherein the graphical user interface is further configured to receive an operation to input the displayed predicted evaluation values as the evaluation values and/or an operation to correct the displayed predicted evaluation values and to input the corrected values as the evaluation values.

7. The embryonic development analysis system of claim 6, wherein the graphical user interface is further configured to receive an operation to sequentially input the evaluation values in the time series.

8. The embryonic development analysis system of claim 7, wherein the circuitry is further configured to select a reference image from the plurality of embryonic development images, the evaluation values having been assigned to the images, and wherein the graphical user interface is further configured to:
   display the selected reference image; and
   display reference evaluation values, the reference evaluation values being assigned to the selected reference image.

9. The embryonic development analysis system of claim 8, wherein the graphical user interface is further configured to receive an operation to input the displayed reference evaluation values as the evaluation values and/or an operation to correct the displayed reference evaluation values and to input the corrected values as the evaluation values.

10. The embryonic development analysis system of claim 9, wherein the graphical user interface is further configured to display a change-in-time of the reference evaluation values assigned to the selected reference image.

11. The embryonic development analysis system of claim 1, wherein the circuitry is further configured to evaluate a characteristic of cells represented in one or more of the plurality of embryonic development images based, at least in part, on the predicted future values for the plurality of evaluation items.

12. The embryonic development analysis system of claim 11, wherein the circuitry is further configured to evaluate a characteristic of cells represented in one or more of the plurality of embryonic development images based, at least in part, on the time series of evaluation values for the plurality of evaluation items and the predicted future values for the plurality of evaluation items.

13. The embryonic development analysis system of claim 1, wherein predicting the future values for the plurality of evaluation items comprises processing the time series of evaluation values for the plurality of evaluation items using a prediction model that incorporates a machine learning algorithm.

14. The embryonic development analysis system of claim 13, wherein the prediction model includes a plurality of coefficients used to predict the future values of the plurality of evaluation items, and wherein the circuitry is further configured to update one or more of the plurality of coefficients based on the determined time series of evaluation values for the plurality of evaluation items and/or the predicted future values for the plurality of evaluation items.

15. The embryonic development analysis system of claim 14, wherein the circuitry is further configured to:
   receive quality information about the cells after an embryo associated with the cells has been implanted; and
   update one or more of the plurality of coefficients based, at least in part, on the received quality information.

16. The embryonic development analysis system of claim 15, wherein updating one more of the plurality of coefficients comprises calculating a loss function based on the predicted future values and the time series of determined evaluation values and updating the one or more of the plurality of coefficients based, at least in part, on the calculated loss function.

17. The embryonic development analysis system of claim 13, wherein the circuitry is further configured to train the prediction model based, at least in part, on an analysis of one or more unlabeled images.

18. The embryonic development analysis system of claim 1, wherein predicting the future values for the plurality of evaluation items comprises:
preprocessing an image of the plurality of embryonic development images, wherein preprocessing the image comprises normalizing the image and/or adjusting a position of cells represented in the image; and
predicting the future values based, at least in part, on the preprocessed image.

19. The embryonic development analysis system of claim 18, wherein predicting the future values for the plurality of evaluation items comprises:
calculating, based on the preprocessed image, an intermediate representation in the prediction model; and
predicting the future values based, at least in part, on the intermediate representation.

20. The embryonic development analysis system of claim 1, wherein at least some evaluation values in the time series of evaluation values correspond to multiple of the plurality of embryonic development images.

21. The embryonic development analysis system of claim 20, wherein at least one of the evaluation values corresponding to multiple of the plurality of embryonic development images corresponds to a time period from a start point in the time series of captured images to a predetermined developing stage of a fertile ovum represented in one or more of the plurality of embryonic development images.

22. An embryonic development analysis method comprising:
obtaining a plurality of embryonic development images captured in a time series;
determining, for at least one of the plurality of embryonic development images, a time series of evaluation values for each of a plurality of evaluation items associated with the plurality of embryonic development images;
predicting based on the determined time series of evaluation values for the plurality of evaluation items, future values for the plurality of evaluation items; and
outputting the future values for the plurality of evaluation items.

23. An embryonic development analysis system comprising:
an image capture device configured to capture a time series of embryonic development images;
a memory configured to store the captured time series of embryonic development images; and
circuitry configured to:
instruct the image capture device to capture the time series of embryonic development images;
determine, for at least one of the plurality of embryonic development images, a time series of evaluation values for each of a plurality of evaluation items associated with the plurality of embryonic development images;
predict based on the determined time series of evaluation values for the plurality of evaluation items, future values for the plurality of evaluation items; and
output the future values for the plurality of evaluation items.

* * * * *